United States Patent
Angell et al.

(10) Patent No.: US 7,833,643 B2
(45) Date of Patent: Nov. 16, 2010

(54) NEUTRAL PROTIC-SALT ELECTROLYTES AND PROTIC-SALT IMBIBED POLYMER MEMBRANES FOR HIGH TEMPERATURE FUEL CELL APPLICATIONS

(75) Inventors: Charles Austen Angell, Mesa, AZ (US); Xiao-Guang Sun, Tempe, AZ (US); Jean-Philippe Belieres, Chandler, AZ (US); Dominic Francis Gervasio, Fountain Hills, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 1076 days.

(21) Appl. No.: 11/535,467

(22) Filed: Sep. 26, 2006

(65) Prior Publication Data
US 2007/0122675 A1    May 31, 2007

Related U.S. Application Data

(60) Provisional application No. 60/720,572, filed on Sep. 26, 2005.

(51) Int. Cl.
*H01M 8/10* (2006.01)
(52) U.S. Cl. .......... 429/33; 429/314; 429/317; 521/27
(58) Field of Classification Search .......... 429/33, 429/314, 317; 521/27
See application file for complete search history.

(56) References Cited

U.S. PATENT DOCUMENTS

2007/0006774 A1*  1/2007  Rogers et al. .......... 106/200.2
2009/0133746 A1*  5/2009  Jin et al. .......... 136/256

OTHER PUBLICATIONS

Kerres, J.A., "Development of ionomer membranes for fuel cells," J. Membrane Sciences, 185, 3-27 (2001).*
Nolte, R., Ledjeff, K., Bauer, M., and Mulhaupt, R., "Partially sulfonated poly(axylene ether sulfone)- A versatile proton conducting membrane material for modern energy conversion technologies," J. Membrane Sciences, 83,211-220 (1993).*
Xu, W. and Angell, C.A., "Solvent-Free Electrolytes with Aqueous Solution- Like Conductivities," Science, 302, 422-425 (2003).*
Kerres, J.A., "Development of ionomer membranes for fuel cells," J. Membrane Sciences, 185, 3 (2001).

* cited by examiner

*Primary Examiner*—Peter D Mulcahy
*Assistant Examiner*—Henry Hu
(74) *Attorney, Agent, or Firm*—Fish & Richardson P.C.

(57) ABSTRACT

A neutral protic salt electrolyte and a protic-salt imbibed polymer electrolyte membrane exhibiting high ionic conductivity and thermal stability at temperatures greater than 100° C. without requiring additional humidification systems or hydrating water is disclosed. The protic salt is the neutral product of acids and bases for which the proton transfer energy lies in the range from 0.5 to 1.5 eV. A polymer electrolyte membrane having the general formula:

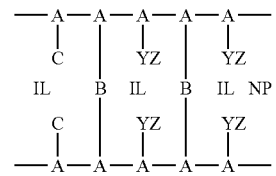

wherein A is a repeating unit in the main chain, B is a crosslinker chain, C is an end group, YZ is a neutralized couple at chain end, IL is an ionic liquid, and NP is a nanoparticle which absorbs the protic liquid yielding membranes that combine high mechanical strength with high conductivity. The present polymer electrolyte membrane is useful in high temperature fuel cells for automotive, industrial, and mobile communication applications.

25 Claims, 28 Drawing Sheets

A, REPEATING UNIT
B, CROSSLINKER CHAIN
C, END GROUP
Y Z, NEUTRALIZED COUPLE
IL, IONIC LIQUID
NP, NANO PARTICLES

A, REPEATING UNIT
B, CROSSLINKER CHAIN
C, END GROUP
Y Z, NEUTRALIZED COUPLE
IL, IONIC LIQUID
NP, NANO PARTICLES

|  | occ | vac | $pK_a$ | E/eV |
|---|---|---|---|---|
|  | HSbF$_6$ | SbF$_6^-$ | | |
|  | HClO$_4$ | HClO$_4^-$ | | |
|  | HTf | Tf$^-$ | −14 | 0.83 |
| ACID ELECTROLYTES | HSO$_3$F | SO$_3$F$^-$ | | |
|  | H$_2$SO$_4$ | HSO$_4^-$ | | |
|  | HPO$_2$F$_2$ | PO$_2$F$_2^-$ | | |
|  | HCH$_3$SO$_3$ | CH$_3$SO$_3^-$ | | |
|  | HCF$_3$CO$_2$ | CF$_3$CO$_2^-$ | | |
|  | H$_3$O$^+$ | H$_2$O | 0 | 0 |
|  | HNO$_3$ | NO$_3^-$ | | |
|  | NITROALINIUM | NITROANILINE | | |
| NEUTRAL ELECTROLYTES | HF | F$^-$ | | |
|  | HIm$^+$ | Im | | |
|  | EtNH$_3^+$ | EtNH$_2$ | | |
|  | H$_2$O | OH$^-$ | 14 | −0.83 |
| BASIC ELECTROLYTES | NH$_3$ | NH$_2^-$ | | |
|  | OH$^-$ | O$^{2-}$ | 28 | (Na$_2$O) |
|  | CH$_4$ | CH$_3^-$ | | (LiCH$_3$) |
|  | NH$_2^-$ | NH$^{2-}$ | | |

EAN → HNO$_3$ / NITROALINIUM ... EtNH$_3^+$

FIG. 3A

NEUTRAL PROTIC-SALT ELECTROLYTES AND PROTIC-SALT IMBIBED POLYMER MEMBRANES FOR HIGH TEMPERATURE FUEL CELL APPLICATIONS

CLAIM TO DOMESTIC PRIORITY

The present non-provisional patent application claims priority to provisional application Ser. No. 60/720,572 entitled "Materials Having High Ionic Conductivities for High Temperature Fuel Cell Applications," filed on Sep. 26, 2005 by C. Austen Angell et al.

STATEMENT REGARDING FEDERALLY-SPONSORED RESEARCH OR DEVELOPMENT

The U.S. Government has a paid-up license in the present invention and the right in limited circumstances to require the patent owner to license others on fair and reasonable terms as provided by the terms of Grant Number W911NF-04-1-0060, awarded by the Army Research Office.

FIELD OF THE INVENTION

The present invention relates in general to electrochemical cells such as fuel cells and, more specifically, to proton exchange membrane fuel cells (PEMFC). In particular, the invention relates to neutral protic-salt electrolytes in liquid form (PIL) and, more specifically, to a protic-salt imbibed novel polymer electrolyte membrane with improved ionic conductivity and improved thermal stability suitable for use as an electrolyte in such PEMFCs, and a fuel cell system comprising same.

BACKGROUND OF THE INVENTION

Fuel cells are electrochemical devices in which electricity is produced by a direct reaction of a fuel and an oxidizer. Fuel cells, such as those based on polymer electrolyte membranes, also called proton exchange membranes (PEMs), are highly efficient, nonpolluting and silent in operation. Hence, PEMFCs are becoming an increasingly important technology, with both stationary applications such as block power stations for on-site power generation and mobile applications such as automotive, industrial, transportation, and mobile communications.

Problems impeding the development of fuel cell technology mainly involve electrocatalysts and electrolyte membranes used within the fuel cells. In the operation of a fuel cell, electrochemical oxidation and/or reduction reactions take place at the surface of the electrodes. Poisoning of catalysts used within fuel cells, such as platinoid catalysts, platinum-based catalysts and the like, can occur in fuel cells at usual operating temperatures, which are typically below around 80° C., due to properties of the membrane material. Accordingly, there is a motivation to increase the operating temperature of fuel cells to greater than about 100° C. in order not only to enhance the reaction kinetics, since reaction rates increase with temperature, but also to enhance electrode tolerance to species such as carbon monoxide, which is a byproduct of fuel processing, which can poison or otherwise degrade the electrode surface.

It is the presence of solvents, such as water, in the electrolyte membranes of most current fuel cells that limits the fuel cell's performance. In conventional fuel cells, the membranes separating the electrodes rely heavily on water as a proton charge carrier. This reliance limits the operating temperature range of such fuel cells to less than 100° C. at atmospheric pressure otherwise the water evaporates, killing the conductivity. Currently, the state of the art PEM material used in fuel cells is Nafion (DuPont, United States). PEMFCs utilizing Nafion to form the PEM are limited to an operating temperature below or near 80° C. in order to maintain proper hydration of the PEM. Proper hydration of a Nafion PEM is critical for good proton conductivity and overall fuel cell performance. Low temperatures also are required to maintain the material integrity of Nafion, which is lost at temperatures near 100° C.

Most existing PEMs also require high purity hydrogen ($H_2$) as a fuel in order to function correctly. The ability to operate at temperatures above approximately 140° C. would allow the use of a broader range of more widely available and lower-cost materials, including impure hydrogen, and hydrocarbons such as methanol or the like, and would make the PEMs less susceptible to contamination. Operation at temperatures greater than 100° C. also would permit a simplified system with all-gas fluidics, since materials such as water exist as a vapor at these high temperatures. Finally, low temperature operation of existing PEM-based fuel cells does not allow waste heat to be utilized. The PEM cannot be used in conjunction with a reformer that can capture and utilize the heat to increase fuel cell efficiency further.

In order to overcome the limitations associated with conventional fuel cell membranes, two classes of PEMs have been proposed: phosphoric acid fuel cells and solid acid fuel cells. Problems are associated with both of these types of membranes. Although phosphoric acid-loaded polybenzimadole PEM electrolytes are able to operate at higher temperatures, the fuel cell stability is limited due to electrolyte adsorption on platinum (Pt) catalysts resulting in low voltage generation. The solid acid membranes have similar hydrolysis and stability limitations in the presence of liquid water, resulting in reduced efficiency.

General considerations for electrolytes used in fuel cells are (1) electrolyte must be a conductor for protons, preferably with a conductivity for hydrogen ions ($H^+$) greater than approximately $10^{-2}$ Siemen/cm; (2) electrolyte must be an insulator for electrons, with a conductivity for electrons ($e^{31}$) less than approximately $10^{-9}$ Siemen/cm; (3) electrolyte must operate at temperatures in the range approximately between −50 and 230° C.; (4) electrolyte must be dimensionally stable at temperatures in the range approximately between −50 and 230° C.; (5) electrolyte must be stable to aqueous acid and alkaline media; (6) electrolyte must be stable under reducing potentials in the presence of a catalyst such as Pt at temperatures up to about 230° C., and in the presence of $H_2$ or a hydrocarbon on the catalyst; and (7) electrolyte must be stable under oxidizing environments in the presence of a catalyst such as Pt at temperatures up to about 230° C., and in the presence of oxygen ($O_2$), which can be from the air, on the catalyst.

Additional requirements exist for membranes used in fuel cells (1) membrane must have a low permeability to $H_2$ and $O_2$ gas; (2) membrane should not allow electroosmosis (i.e., transfer of water with a proton); (3) membrane must be dimensionally stable with a change of hydration state; (4) membrane must have a low thermal expansion coefficient; (5) membrane must have good cohesion with or adhesion to electrodes used in the fuel cell; and (6) membrane must be free of defects such as pin-holes to ensure no or very low reactant cross-over and no electrode shorting.

In view of the problems with prior art membranes, there is a need for improved proton-transporting membranes capable of sustaining high and stable conductivity at temperatures greater than 100° C. without requiring additional humidification systems or hydrating water.

BRIEF DESCRIPTION OF THE DRAWINGS

FIG. 3A is a schematic illustrating the energy gaps separating acid and base components of protic ionic liquids;

DETAILED DESCRIPTION OF THE INVENTION

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

The present invention provides for use of neutral protic-salt liquids as electrolytes in the manufacture of fuel cells as well as fuel cells incorporating protic-salt imbibed PEMs having good conductivity for protons and that can operate at ambient pressure and high temperature. Fuel cells are electrochemical devices in which electricity is produced by a direct reaction of a fuel and an oxidizer. Fuel cells, such as those based on polymer electrolyte membranes, also called proton exchange membranes (PEMs), are highly efficient, nonpolluting and silent in operation. Hence, PEMFCs are becoming an increasingly important technology, with both stationary applications such as block power stations for on-site power generation and mobile applications such as automotive, industrial, transportation, and mobile communications.

Figure 1:
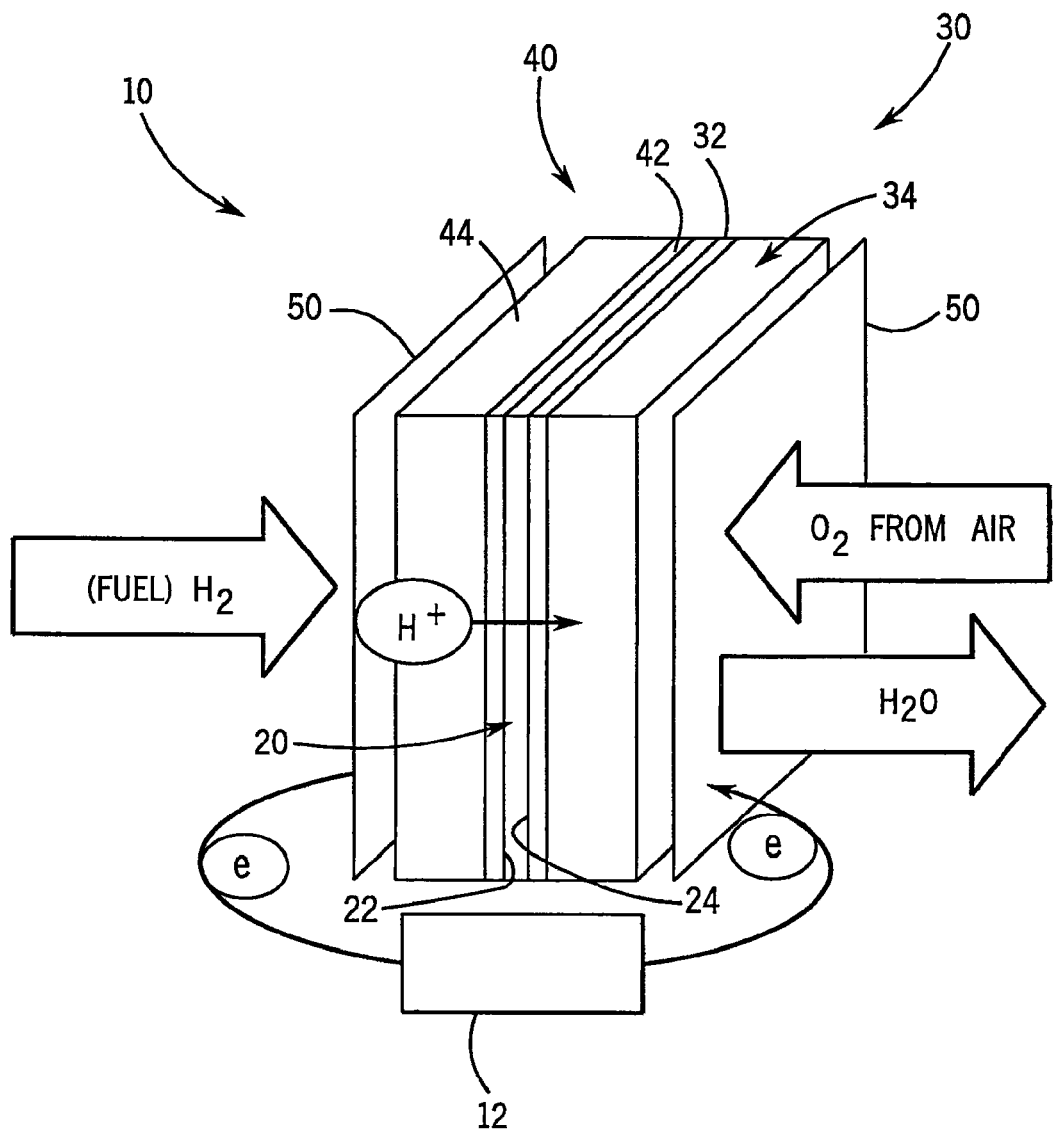
FIG. 1 illustrates the structure of a conventional fuel cell employing a polymer exchange membrane.

FIG. 1 illustrates a fuel cell 10 as a working environment for a protic-salt imbibed PEM of the present invention. The PEM 20 is shown having a first catalyst surface 22 and an opposed second catalyst surface 24. An anode 30 having an anode catalyst 32 and a cathode 40 having a cathode catalyst 42 are supported adjacent to the opposed first and second catalyst surfaces of the PEM. Suitable choices for the cathode catalyst 42 and anode catalyst 32 include at least one catalyst selected from the group consisting of platinum, ruthenium, osmium, a platinum-ruthenium alloy, a platinum-osmium alloy, a platinum-palladium alloy, or a platinum alloy.

A porous anode substrate 34 is secured adjacent to the anode catalyst 32 and a porous cathode substrate 44 is secured adjacent to the cathode catalyst 42. The electrode substrates may include a carbon paper, a carbon cloth, or a carbon felt, but are not limited thereto. The electrode substrates support the catalyst layer and enable a reaction fluid to diffuse in the catalyst layer.

The anode 30 and cathode 40 may further include microporous layers in order to increase the reactant diffusion effects between the electrode substrate and catalyst layer.

The anode 30 and cathode 40 are each connected to a current collector 50 which in turn is connected to load 12 to provide electrical power to the load. Load 12 may be a mobile phone, automobile motor, or industrial load, to name just a few.

As a feature of the present invention, a novel PEM 20 is provided. PEM 20 performs as a separator and solid electrolyte in applications such as a fuel cell 10, in which the membrane selectively allows the transport of protons from anode 30 to cathode 40. PEM 20 is chemically resistant and capable of sustaining high and stable conductivity at temperatures greater than 100° C. and ambient pressure without requiring additional humidification systems or hydrating water.

A class of solvent-free protic liquids of high conductivity is provided that are the neutral products of acids and bases and for which the proton transfer energy lies in the range from approximately 0.5 to 1.5 electron volt (eV). Polymer hosts absorb the protic liquids to yield PEMs that combine high mechanical strength with high ionic conductivity.

Figure 2A:
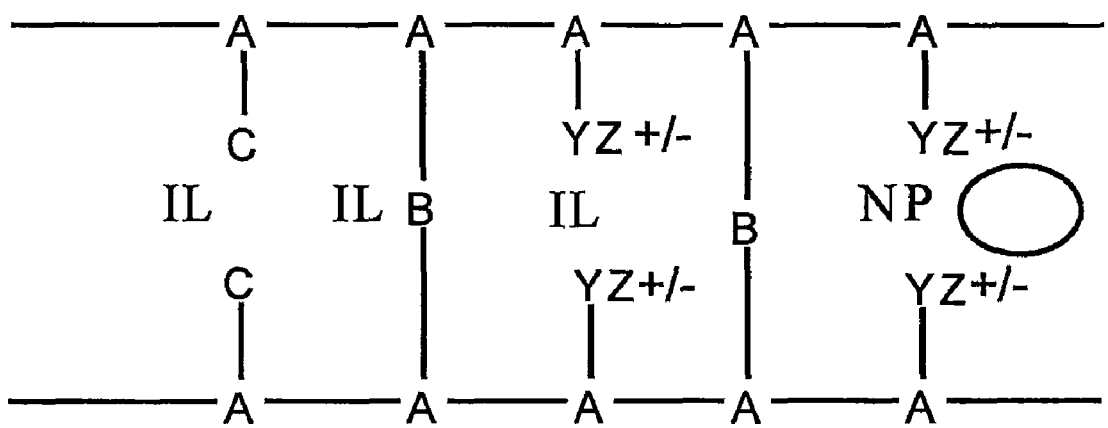
FIG. 2A is a schematic representation of a polymer electrolyte membrane.

Referring now to FIG. 2A, there is shown a schematic depiction of the PEM of the present invention. As will be seen, PEM 20 consists of a repeating unit, A, in a main chain. In the foregoing structure, repeating unit A is a polymer. Examples of polymers suitable for use in the PEM, include, but are not limited to, polysiloxane, poly(ethyelene oxide), polyacrylate, polymethacrylate, polysulfone, polyethylenimine, and polybenzylimidazole.

As shown in FIG. 2A, the polymers A in PEM 20 can be separated or crosslinked. Crosslinking is achieved by including crosslinker chain B in PEM 20. Useful crosslinkers include, without limitation, alkane chains and poly(ethylene oxide). As depicted in FIG. 2A, PEM 20 also includes an endgroup C on a crosslinker chain or a polymer chain. Endgroup C is chosen from materials, including but not limited to, hydroxyl-, amine- and imine-containing materials.

PEM 20 also contains neutralized couples, YZ, which are formed as a result of a reaction between an acid and a base, where Y represents material of one type and Z represents a material of a second type. Y is typically a base, but it can also be an acid. Z is typically an acid, but it can be a base. In the case where Y is a base, Y may be selected from materials including, without limitation, materials containing a chemical group such as nitrogen, in amine, imine, imidazole, pyridine and the like; phosphorus in phosphine analogs; oxygen, as in alcohols and related proton-accepting molecules; and sulfur, as in thiols, if the acid is very strong. In the case where Z is an acid, Z may be selected from the group consisting of, but not limited to, hydrofluoric acid, trifluoromethanesulfonic acid, methanesulfonic acid, trifluoroacetic acid, nitric acid, phosphoric acid, monofluorophosphoric acid, difluorophosphoric acid, tetrafluoroboric acid, hydrogen bis(trifluoromethanesulfonyl)imide, hydrogen bis(perfluoroethanesulfonyl)imide, and the like. For acidic polymers, Y can be selected from the group including, but not limited to, the above mentioned acids, while Z may be selected from the group including but not limited to the above-mentioned bases.

PEM 20 may include nanoparticles, NP. The choice of nanoparticle may vary widely. Useful nanoparticles NP are nano- or micro-sized materials. Examples of useful nanoparticles include, but are not limited to, modified fumed silica, unmodified fumed silica, titanium oxide, aluminum oxide or the like. A purpose of nanoparticles NP is to increase mechanical stability of the membrane without affecting adversely its conductivity. Another purpose of nanoparticles NP is to increase the surface area of the membrane. Yet another purpose of nanoparticles NP is to increase the amount of an ionic liquid held in the membrane.

In one embodiment of the present invention, liquid sorbed PEMs with covalently and electrostatically immobilized ions are made. The liquids of the present invention are provided by ambient temperature molten neutral protic salts, also called ionic liquids (ILs). Ionic liquids with exchangeable protons, i.e., protic ionic liquids, can be prepared by using anhydrous Brönsted acid-base reactions. The IL of the present invention may be selected from neutral products formed from a reaction between a base and an acid. In one embodiment of the present invention, the ionic liquid IL is included in PEM 20. In a further embodiment, ionic liquid IL is bound to PEM 20 by an electrostatic force of attraction or the like.

Figure 2B:
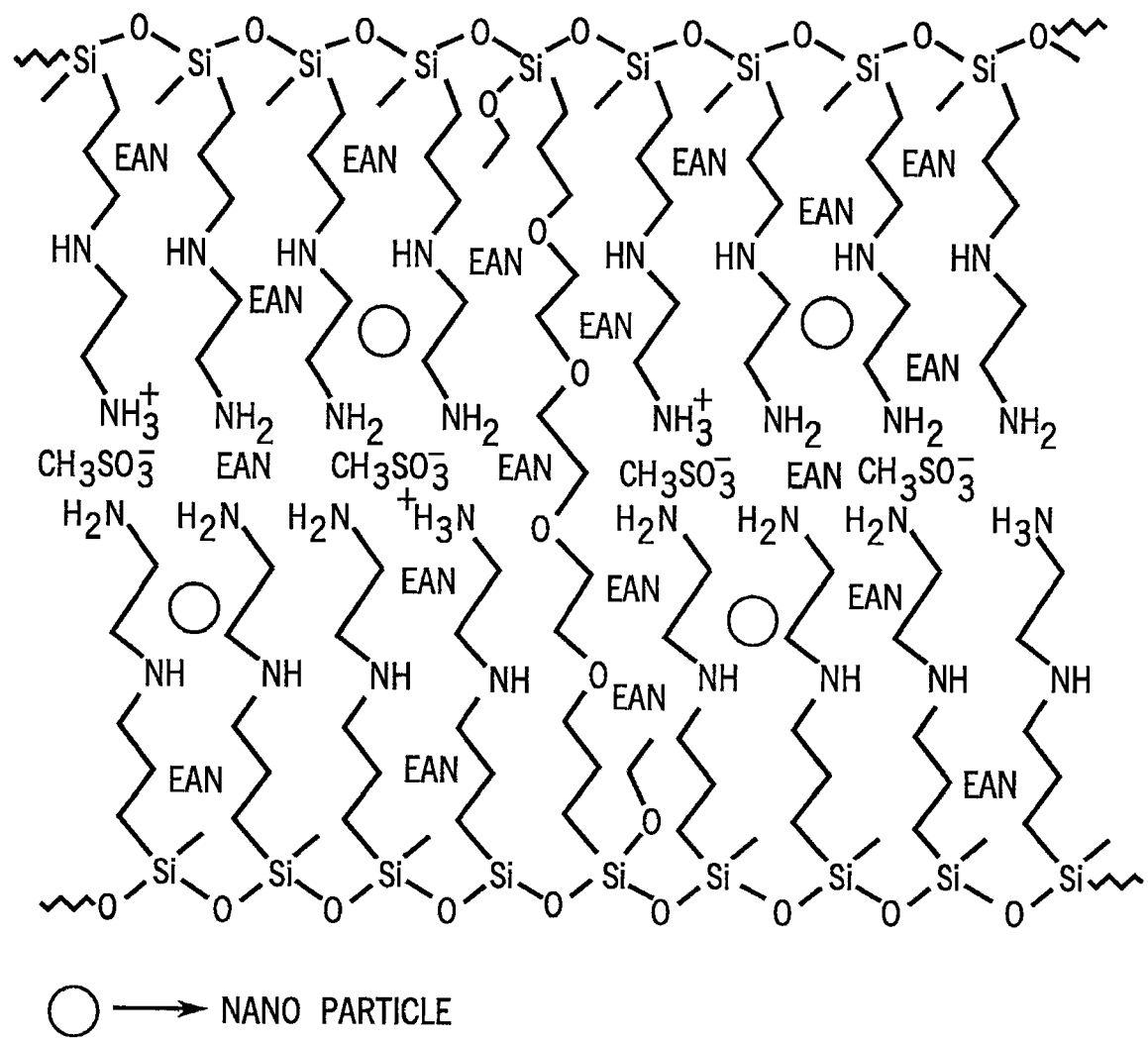
FIG. 2B is an expanded schematic representation of a polymer electrolyte membrane.

Referring now to FIG. 2B, there is shown a schematic depiction of the PEM of the present invention having crosslinked poly(N-2-aminoethyl)-3-aminopropyl-methylsiloxane) doped with methanesulfonic acid at the ratio of terminal $NH_2:CH_3SO_3H=4:1$ and containing EAN and fumed silica A200.

In one embodiment of the present invention, a neutral protic IL is made by transferring a proton from a moderately strong acid to a base stronger than water, e.g., ammonia or ethylamine. A minimum difference between an acid strength and a base strength, measured using a pKa scale, is approximately 10, to ensure a good electromotive force (EMF) in a fuel cell, as quantified by a measurement of an open-circuit voltage (OCV). Open-circuit voltages are measured in a gas-fed fuel cell of the sandwich type using protic ionic liquids as the electrolytes and can be represented using a $\Delta pKa$ (difference in proton dissociation constant—proportional to proton transfer energy) scale. For $\Delta pKa$ values less than approximately 10, a reduced OCV is obtained, due to a poor donor-acceptor identity between an acid and a base. For $\Delta pKa$ values greater than approximately 24, low OCV values are obtained since a proton becomes too strongly attached to (or captured by) an acceptor, thereby hindering motion ('transfer' more relevant than 'motion') of a proton.

The difference in proton dissociation constant also indicates an energy separation. At a temperature of approximately 300° K., a $\Delta pKa$ of 10 corresponds to an energy separation of approximately 0.6 eV. In one embodiment of the present invention, an energy of reaction between an acid and a base is at approximately 0.6 eV, corresponding to a value for $\Delta pKa$ of approximately 10.

Although specific embodiments are described using specific acids and bases, it will be understood that other acids and bases also can be used, where the difference between acid and base strength, $\Delta pKa$, is approximately in the range between 10 and 24.

The best fuel cell electrolytes work by transporting protons from anode to cathode by transferring a proton from one molecular species to another across a free energy gap of 0.5-1.5 eV. For example, in acid electrolytes, the molecular-species transferring a proton are an acid molecule and a water molecule, in which water is the base of the proton transfer couple. In the present invention, high OCV is obtained in a fuel cell utilizing an electrolyte that is neither an acid nor a base, but is formed, by the transfer of a proton across an energy gap of about the same magnitude.

Choice of appropriate acid-base pairs may be understood by considering a proton energy level diagram illustrated in FIG. 3A. The right hand column (vac) contains species with quantized energy levels available for occupation by protons (bases). The left hand column (occ) shows the same species with these sites occupied (conjugate acid). By way of example, combining an acid such as $HNO_3$ with a base such as ethylamine ($EtNH_2$) yields ethyl ammonium nitrate ($EtNH_3^+$) (EAN) ions and $NO_3^-$ ions. For any pair of levels, the stable entities are the right upper ($NO_3^-$) and left lower ($EtNH_3^+$) components, which form product by the proton dropping off the upper occupied level into the lower vacant level.

Figure 3B:
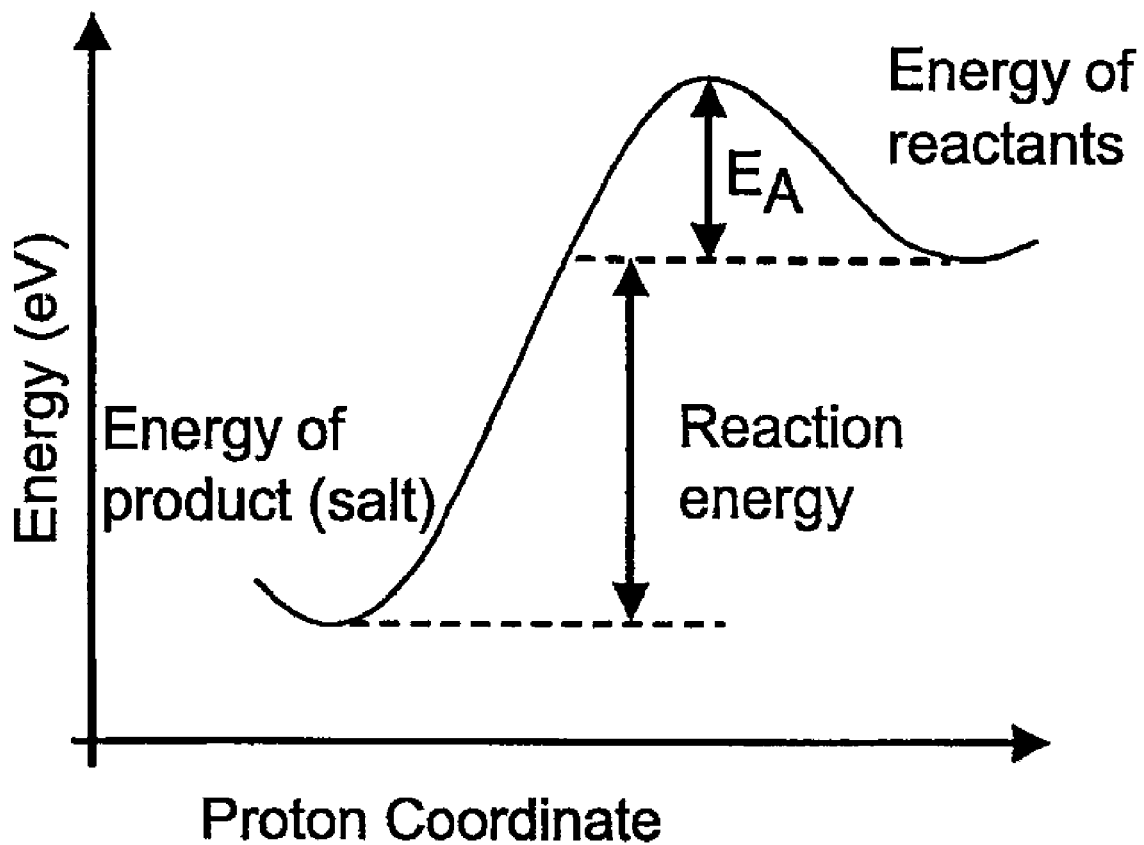
FIG. 3B is a graph illustrating the activation energy of a reaction between an acid and a base and the resultant salt.

Referring now to FIG. 3B, which depicts a reaction energy pathway plot for a reaction between an acid and a base (reactants) to form a salt (product), an acid-base combination, such as $HNO_3$ and ethylamine ($EtNH_2$) is shown to exist at the energy level state indicated on the right-hand side of the graph. For a reaction to occur an activation energy (EA) is supplied to initiate a reaction to form a product. An acid-base reaction forms an ionic salt (EAN) which exists at a lower energy than the reactants, indicated on the left-hand side of the graph. The energy difference between the reactants and products is the reaction free energy (also known as proton transfer energy gap), the energy of reaction is determined by the choice of acid and base. These proton transfer salts (protic salts) can be used neat and being neutral, are non-corrosive, needing no solvent, are involatile and demonstrate excellent short-term performance above 100° C.

In one embodiment of the present invention, a neat non-aqueous protic-salt electrolyte is disclosed consisting of a molecular acid and base that form proton transfer salts that transfer proton from one species to another across a free energy gap of 0.5-1.5 eV. These protic-salt electrolytes can be used as liquids or in membranes.

Example 1

Protic ILs were formed by proton transfer between a Brönsted acid and a Brönsted base. For example, in one embodiment, the protonation reaction for the formation of EAN involved the addition of nitric acid to an equimolar amount of ethylamine in aqueous solution. The mixture was stirred at room temperature for several hours. To ensure a complete reaction, a slight excess of amine was left over and was removed along with the water by heating at 80° C. in vacuum using a rotary evaporator. The product was then dried at 80° C. for two days in a vacuum oven containing P2O5 to remove any excess water. The same general process may be used for the synthesis of all PILs of this type, but when amines of higher molecular weight are employed, there is a risk of contamination of the product by residual amines. Thus, for most syntheses, the reactions were carried out without any solvent. Since these reactions were very exothermic, the dropwise addition of the acid to the amine was carried out by cooling the amine solution to −78° C. using an acetone/dry-ice bath. When necessary, adequate purification procedures were applied to the chemicals, although in general they were used as received.

The structure of each PIL was identified by NMR spectroscopy and by elemental analysis. The complete removal of water and the absence of other —OH species was confirmed by the lack of O—H stretching bands from 3400 to 3800 cm-1 in the infrared spectra of the final melts. The PILs were then stored in an argon atmosphere glovebox.

Protic-salt electrolytes demonstrate excellent short-term performance. The short-term performance is not a property of the specific material used to make a particular protic salt, but is a general consequence of choosing a protic salt with any number of materials as long as the protic salt has the proper proton transfer energy gap and suitable Pt adsorption properties.

Stability of the electrolytes in Pt can be probed by voltammetry. Voltammetry gives the current between the Pt electrode and counter electrode as a function of sweeping the applied Pt electrode potential versus a reference electrode potential. Voltammetry was done in a glass cell at room temperature and atmospheric pressure with a Pt foil electrode (A=2 cm$^2$) that was flame annealed in a gas-air flame and quenched in water then rinsed with methanol and air dried before each use. The counter electrode was a spectroscopic graphite rod and the reference was a reversible hydrogen electrode (RHE) made with a platinized platinum electrode in aqueous 85% $H_3PO_4$ sealed under a hydrogen atmosphere. A cracked Pt junction connected the reference electrode to bulk electrolyte. Whenever phosphoric acid was not the bulk electrolyte, a junction potential developed. The junction potentials for the different bulk electrolytes were measured versus a saturated calomel electrode (SEC) ($E_{SCE}$=+242 mV vs. NHE) and are given in Table 1, below.

TABLE 1

| Potentials for RHE in different electrolyte versus SCE. |
|---|
| $E_{SCE}$ = +220 mV vs. RHE in 0.5M $H_2SO_4$ |
| $E_{SCE}$ = +190 mV vs. RHE in 85% $H_3PO_4$ |
| $E_{SCE}$ = +165 mV vs. RHE in neat TEAMS |

Figure 4:
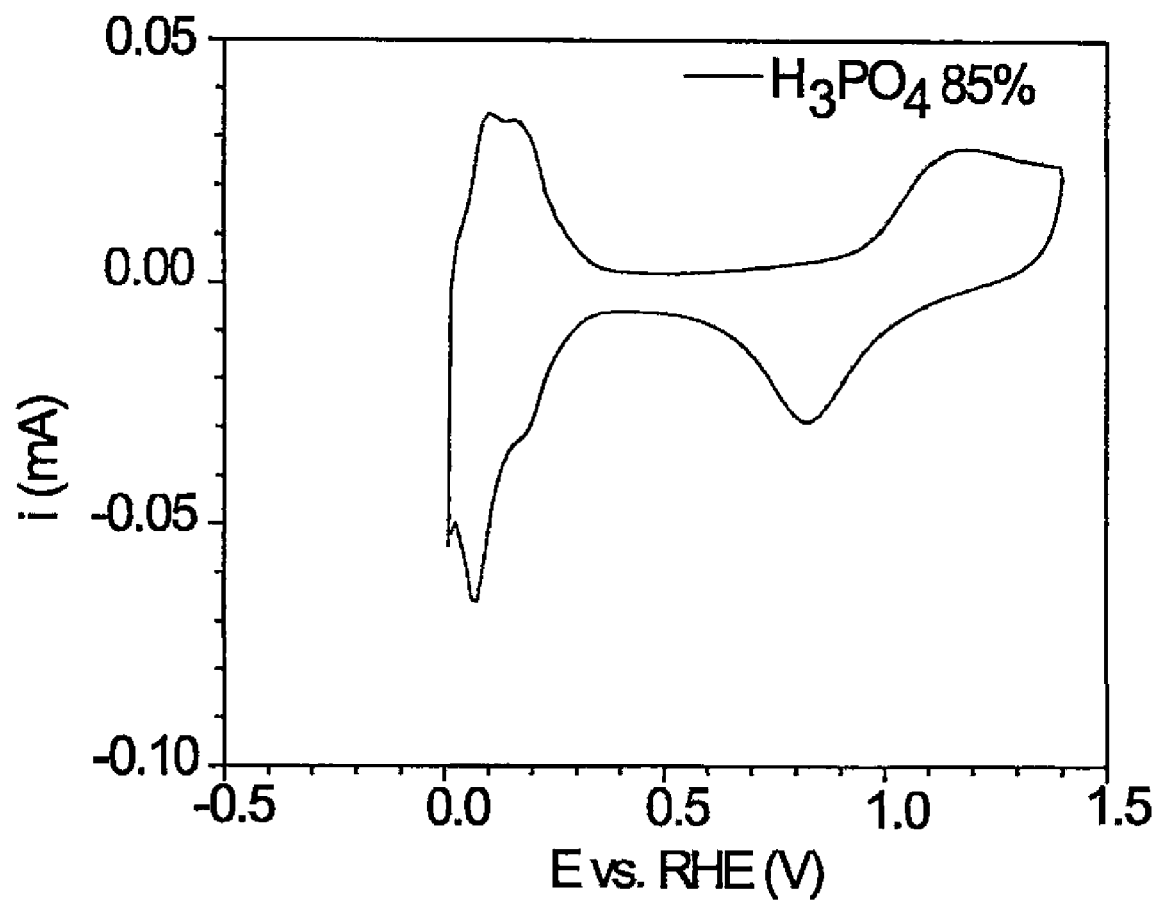
FIG. 4 is a voltammogram of Pt in aqueous 85% $H_3PO_4$ under an oxygen atmosphere at room temperature and atmospheric pressure. Scan rate 100 mV/s (+2 mV to +1400 mV). Area Pt electrode=2 $cm^2$.

All Pt electrode potentials are given versus SCE. FIG. 4 is characteristic of Pt in relatively pure phosphoric acid with well-defined fairly symmetrical hydrogen adsorption and desorption processes between 0.3 and 0.05V (slight asymmetry due to accompanying oxygen reduction) and with asymmetrical Pt oxide formation and reduction processes between 0.5 to 1.45V. During the positive going potential scan, the onset of Pt oxide formation was seen around 0.8 volts, peaked at 1.1 V and continued until the potential scan direction was reversed at 1.45 V. At once upon scanning negative, the Pt-oxide reduction began, peaked at about 0.8 V, and the surface was completely metallic at about 0.5 V.

Figure 5:
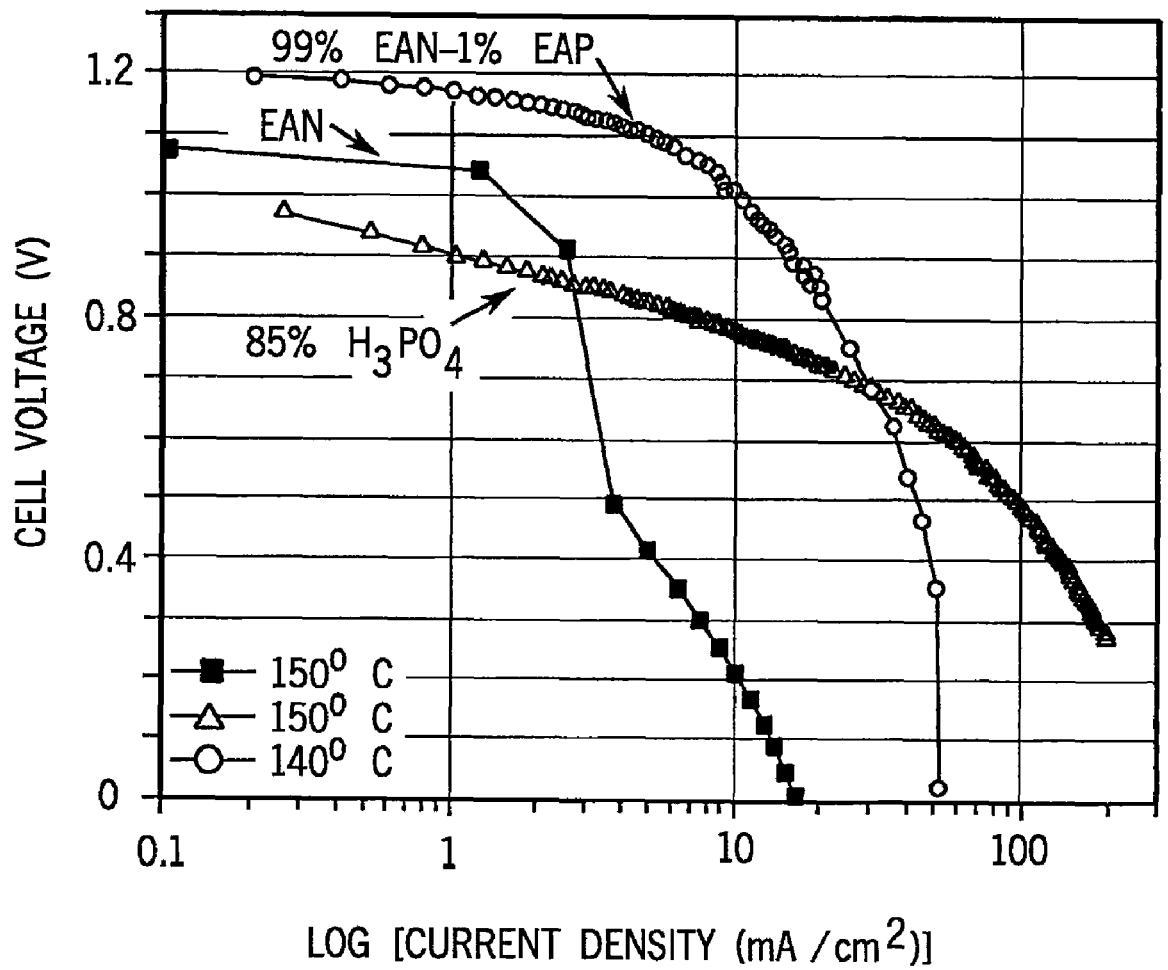
FIG. 5 is a graph illustrating the polarization curves for an $H_2$—$O_2$ fuel cell using Pt catalyzed porous gas fed ETEK ELAT electrodes (0.5 mg Pt/$cm^2$) with various liquid electrolytes at T≧140° C. and ambient pressure.
Figure 6:
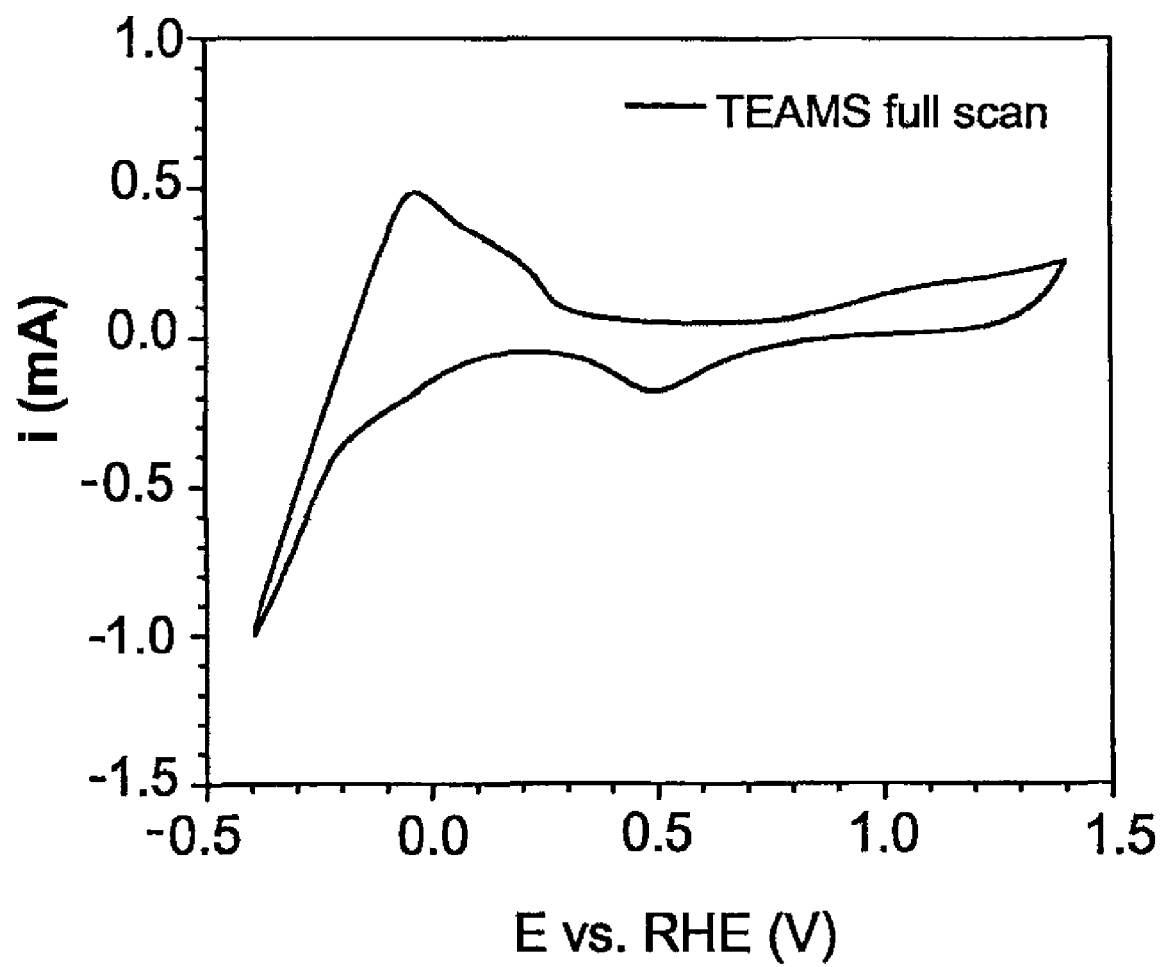
FIG. 6 is a voltammogram of Pt in neat triethylammonium methane sulfonate (TEAMS) electrolyte under an oxygen atmosphere at room temperature and atmospheric pressure. Scan rate 100 mV/s (−400 mV to +14 mV), with area Pt electrode=2 $cm^2$.

FIG. 5 shows that with a neat protic salt electrolyte, liquid EAN, a higher efficiency operation of a hydrogen-oxygen fuel cell resulted than with the most nearly commercialized electrolyte, 85% phosphoric acid 15% wt water. The voltammogram of Pt in tetraethylammonium methane sulfonate (TEAMS), FIG. 6, was similar to that for Pt in phosphoric acid with symmetrical hydrogen adsorption and desorption processes between 0.3 and −0.4V (slight asymmetry due to accompanying oxygen reduction) and with asymmetrical Pt oxide formation and reduction processes between 0.4 to 1.45V. The distortion reflected low water activity and impurities, the result of decomposition of the electrolyte.

Figure 7:
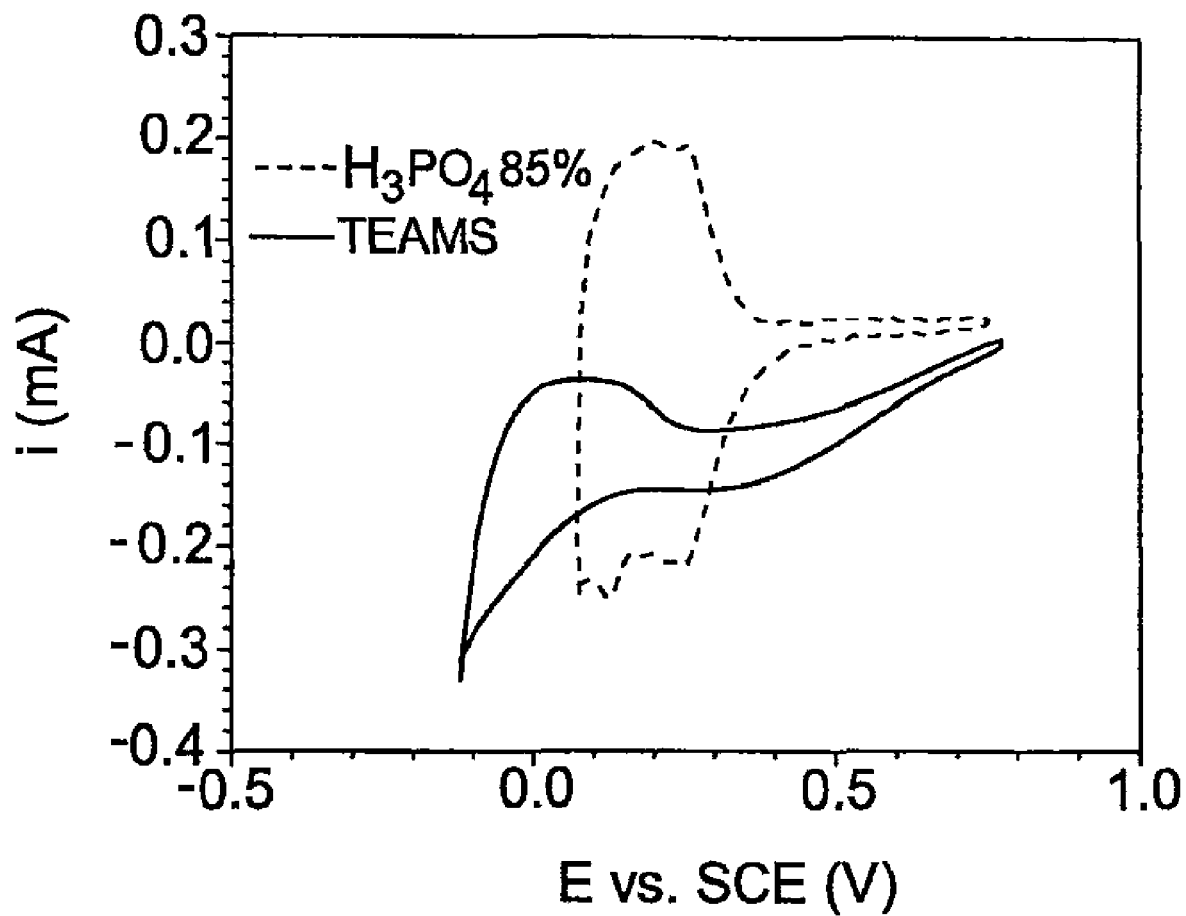
FIG. 7 is a voltammogram of Pt in 85% $H_3PO_4$ and neat TEAMS under $O_2$ atmosphere at room temperature and pressure, with scan rate 100 mV/s and area Pt electrode=2 $cm^2$.
Figure 8:
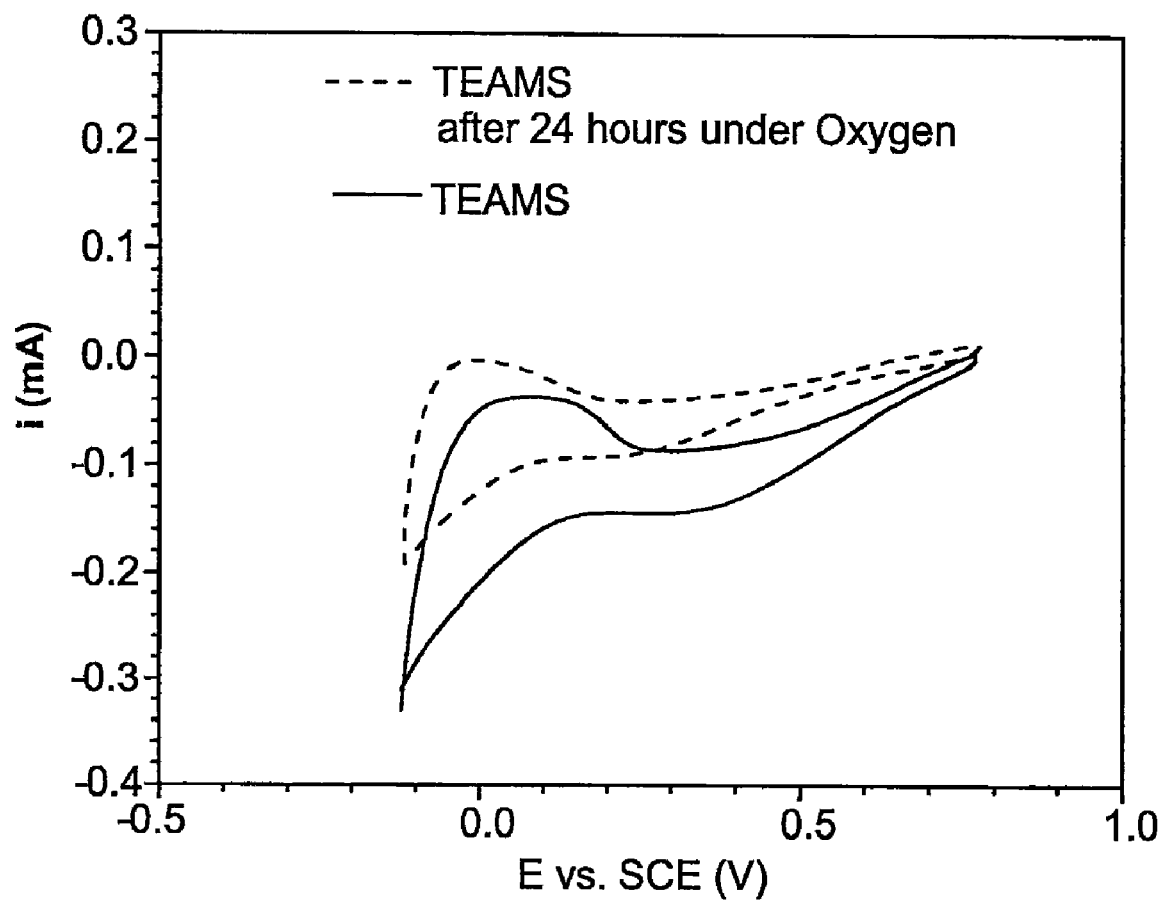
FIG. 8 is a voltammogram of Pt in TEAMS electrolyte under an oxygen atmosphere at room temperature and atmospheric pressure, with scan rate 100 mV/s and area Pt electrode=2 $cm^2$.

FIG. 7 shows the voltammograms of Pt in 85% $H_3PO_4$ and neat fresh TEAMS protic salt electrolyte under $O_2$ atmosphere at room temperature and pressure. Pt was the catalyst for oxygen reduction—not Pt oxide. The upper limit of the potential window was set to 0.8 volt to avoid the effects of Pt-oxide on oxygen reduction and to avoid oxidative degradation of TEAMS. $O_2$ reduction was much more enhanced on Pt with TEAMS relative to phosphoric acid, consistent with the initial improvement found for protic salt electrolyte versus phosphoric acid as shown in FIG. 5. EAN decomposed more quickly than TEAMS as the hydrocarbon moieties in TEAMS are less susceptible to oxidation and, thus, have increased stability. But eventually even TEAMS decomposed as is shown in FIG. 8. The physical instability was a result of the wetting of gas feed channels by the protic salt electrolytes. The chemical and electrical instabilities were related to having used protic salts that have substituents that are gradually decomposed in the presence of Pt and oxygen or oxidizing potentials. A comparison of the Figures illustrates that the stability of protic salt electrolytes can be improved by substituting oxidatively stable moieties (in TEAMS) for oxidatively unstable moieties (in EAN).

Optimization of protic-salt electrolytes for physical and electrochemical stability can be achieved by using a liquid protic-salt electrolyte from acid and bases with chemically inert fluorinated substituents that does not wet a porous electrode and does not soften a polymer membrane matrix. Fluorinated hydrocarbons have a high resistance to oxidation and give even better stability than TEAMS. In one embodiment, a protic-salt IL is formed as a result of an acid and a base, wherein the base is a fluorinated hydrocarbon and the acid is chosen from the group consisting of acids having a pKa between −5 and −17. In the case where the base is a fluorinated hydrocarbon the base may be selected from the group consisting of, but not limited to, $CF_3NH_2$, $(CF_3)_2NH$, $CF_3CF_2NH_2$, $(CF_3CF_2)_2NH$, 2,4,5-trifluoro-imidazole, and $CF_3SO_2NH_2$ and can be reacted with an acid from the group consisting of trifluoromethane sulfonic acid, monofluorophosphoric acid, difluorophosphoric acid, tetrafluoroboric acid, hydrogen bis(trifluoromethanesulfonyl)imide, hydrogen bis(perfluoroethanesulfonyl)imide, and sulfuric acid or the like, to form the PIL.

Example 2

Figure 9:
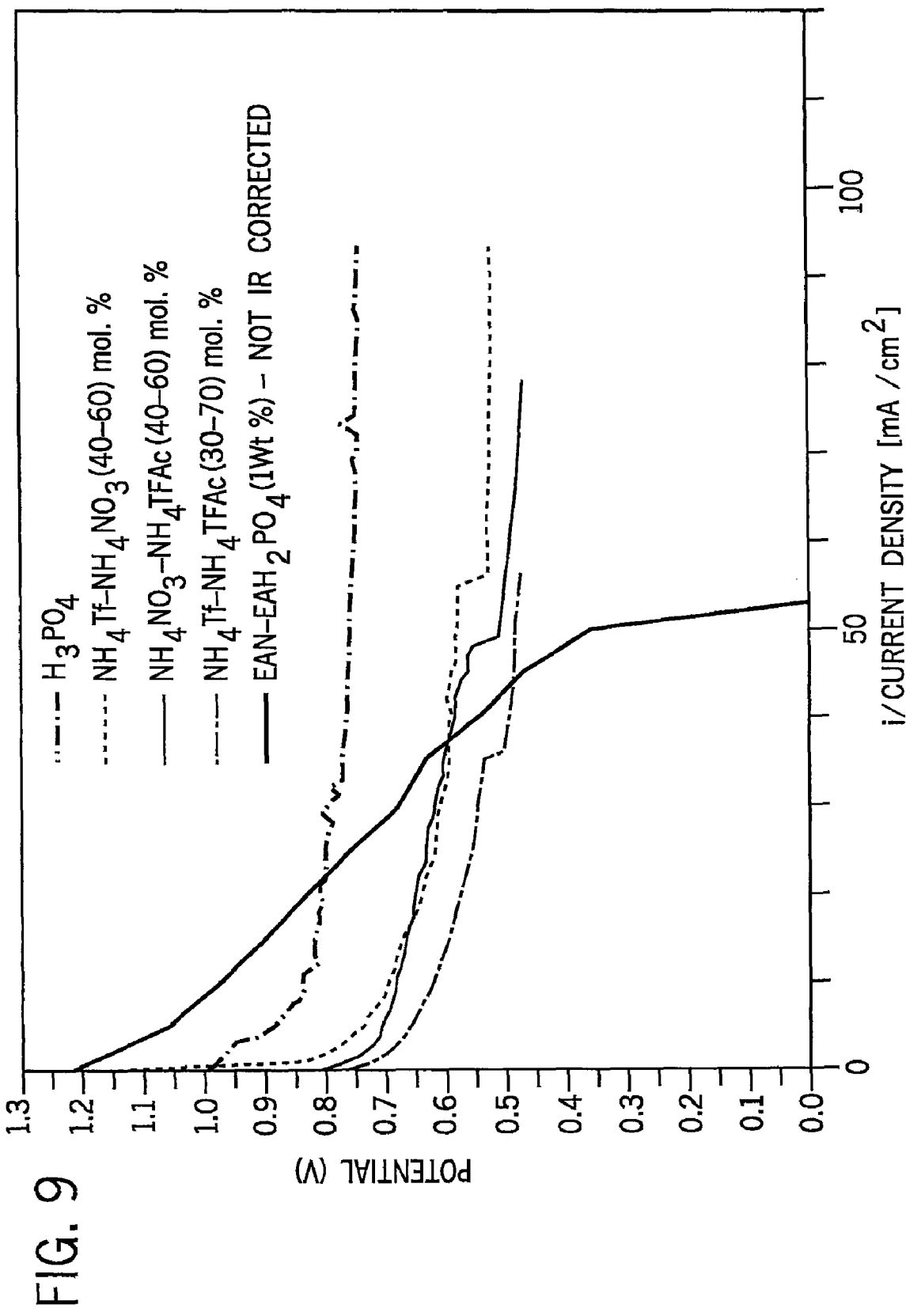
FIG. 9 is an IR-corrected polarization curve for fuel cell with $NH_4Tf$-$NH_4TFAc$ electrolyte, in comparison with those for $EAH_2PO_4$-doped ethylammonium nitrate and phosphoric acid measured in the same cell, the anode and cathode being ETEK Pt catalyzed porous gas fed electrodes with Pt-loading=0.5 mg/$cm^2$, with anode feed being hydrogen and cathode feed being oxygen.

In another embodiment, the protic-salt electrolye is an ammonium salt mixtures. An alternative means of stabilizing the electrolyte against chemical degradation at the electrode is to remove all carbon containing groups from the cation and use ammonium salt mixtures of suitable proportions to maintain melting points below 100° C. Many such mixtures exist, good examples being 1:1 mixtures of ammonium nitrate and ammonium triflate, or ammonium nitrate and ammonium trifluoroacetate. In these the average "proton gap" lies in the favorable interval 0.5-1.5 eV. Some of the fuel cells so made performed almost at the level of phosphoric acid cells without any electrode optimization. Electrolytes were prepared by simple weighing of the individual ammonium salts, many of which are commercially available and others are simply synthesized from the acid and base constituents. FIG. 9 shows the IR-corrected polarization curves obtained with three mixed ammonium salt electrolytes: $NH_4Tf$-$NH_4TFAc$ electrolyte in comparison with those for $EAH_2PO_4$-doped ethylammonium nitrate and phosphoric acid. Results are compared with those for 85% phosphoric acid and with ethyl ammonium nitrate electrolytes, respectively. In these cases current densities above 100 mAcm-2 were easily obtained.

The process of making, using and testing PEM 20 is now described in detail. In the preparation of such materials, it will be understood that other material quantities, processing techniques, processing temperatures, processing tools and processing times also can be used and that the quantities, processing techniques, processing temperatures, processing tools and processing times are used by way of example only. Further, it will be understood that other materials having a similar functionality and material properties as the below mentioned materials can be substituted for the materials set forth below, and that the materials are discussed by way of example only.

Example 2

To fabricate membranes in accordance with the present invention, fumed silica (labeled A200) was used in an unmodified form, as well as modified forms, and incorporated into membranes. Fumed silica A200 was dried in an oven at 140° C. for three days. 7.57 g dried A200 was then mixed with 7.0 ml 3-aminopropyl-triethoxysilane in 200 ml dried toluene. The solution was heated to 120° C. overnight. The solution was then filtered and subsequently washed with methanol, water and acetone carefully and finally dried in an oven at 80° C. with phosphorus pentoxide ($P_2O_5$) for two days. The obtained fumed silica was coded as T200. 5.80 g dried A200 was mixed with 9.0 ml 3-aminopropyl-methyldiethoxysilane in 200 ml dried toluene. The solution was heated to 120° C. overnight. The solution was filtered and subsequently washed with methanol, water and acetone, then carefully and finally dried in an oven at 80° C. with $P_2O_5$ for two days. The obtained fumed silica was coded as D200.

Synthesis Example 1

Figure 10:
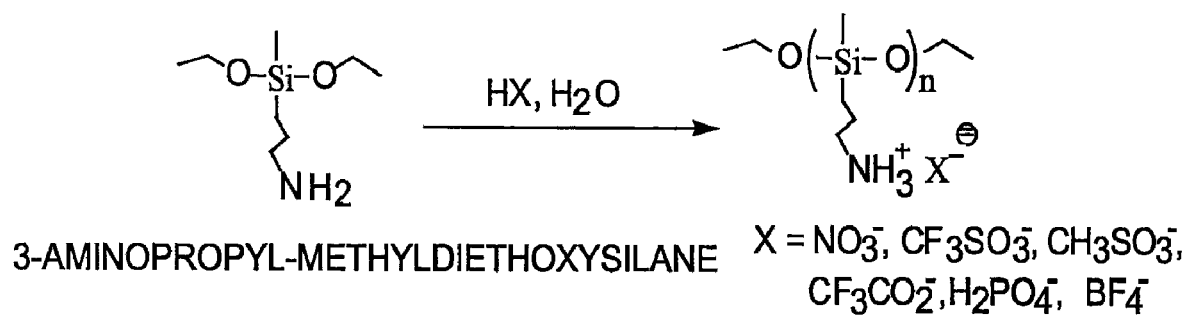
FIG. 10 is a schematic depiction of a linear ammoniated polysiloxane.

The proton-conducting polymer membrane of FIG. 10 was prepared by partial or full neutralization of a pendant amine group by addition of acid. In the case of a partially neutralized pendant amine by acid, 100 g aminopropylmethyldiethoxysilane was mixed with 10 ml $H_2O$ and 100 ml ethanol. The solution was stirred at 60° C. for two days. 10 g of the solution was then partially neutralized with different quantities of acids and stirred at room temperature overnight. The solutions were placed in Teflon dishes and the solvent was removed. Finally, the films were dried in an oven at 80° C. for two days.

In the case of a fully neutralized pendant amine by acid, 70 ml diethoxymethyl-3-propylamine, 32 g $HNO_3$, and 200 ml $H_2O$ was stirred at 60° C. for three days. Water was removed using a roto-evaporator and then dried in an oven with $P_2O_5$ at 80° C. for two days. Similarly, materials based on other acids such as methanesulfonic acid ($CH_3SO_3H$), trifluoromethanesulfonic acid ($CF_3SO_3H$), trifluoroacetic acid ($CF_3CO_2H$), phosphorus acid ($H_3PO_4$), and tetrafluoroboric acid ($HBF_4$) may be synthesized.

Synthesis Example 2

Linear polysiloxane with terminal sulfonic acid group was prepared by dissolving 3-mercaptopropylmethyldimethoxysilane (10 g, 0.1 mole) in 30 ml $H_2O$ and 20 ml methanol. One drop of concentrated hydrochloride acid was added and the solution was heated at 60° C. for two days. The solution was then cooled with ice and hydrogen peroxide solution (30 wt %, 34 g, 0.3 mole) was added slowly. The solution was stirred at room temperature overnight and then refluxed for four hours. The solvent was then removed and dried to get the linear polysiloxane with terminal sulfonic acid group.

Synthesis Example 3

Figure 11:
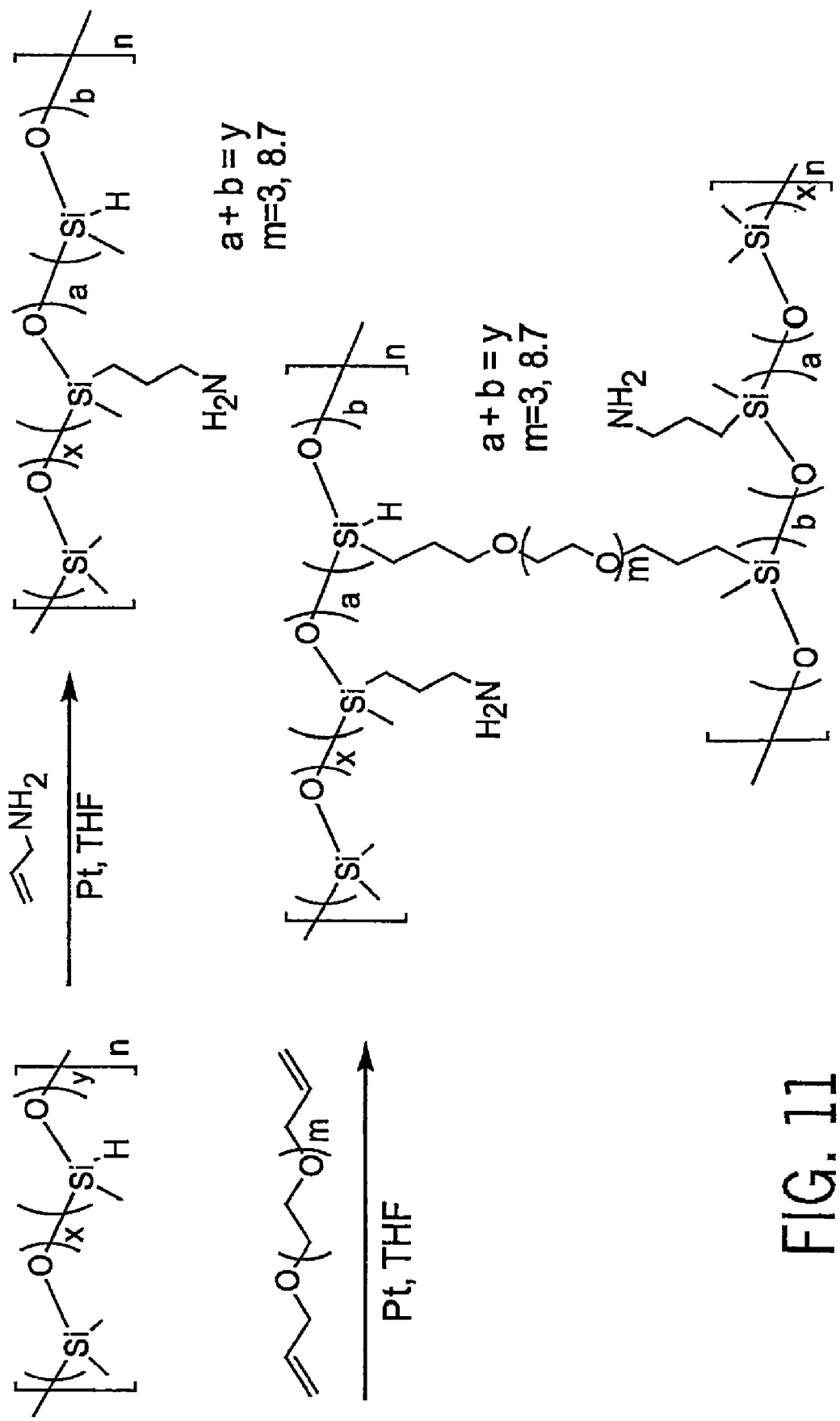
FIG. 11 is a schematic depiction of a cross-linked polysiloxane having a pendant amine group.

The proton-conducting polymer membrane of FIG. 11 was prepared by dissolving 1.5 g Pt-based catalyst solution and 14.5 g allylamine in 150 ml dry tetrahydrofuran (THF) under the protection of nitrogen. The solution was stirred at 45° C.

for one hour before addition of polysiloxane prepolymer (20 g) in 50 ml dry THF through a dropping funnel. After addition the solution was stirred at 45° C. for four days. The solution was directly used for the crosslinking reaction. The polymer weight percentage was calculated to be 14.2 wt % by carefully removing the solvent. 3 g of the above solution was mixed with 0.1 g of PEG400 diallyl ether and 2.104 g of EAN (equal to 80 wt % of ionic liquids) were placed in a Teflon dish and the solvent was removed. The membrane was dried in an oven at 80° C. with $P_2O_5$ for two days.

Synthesis Example 4

Figure 12:
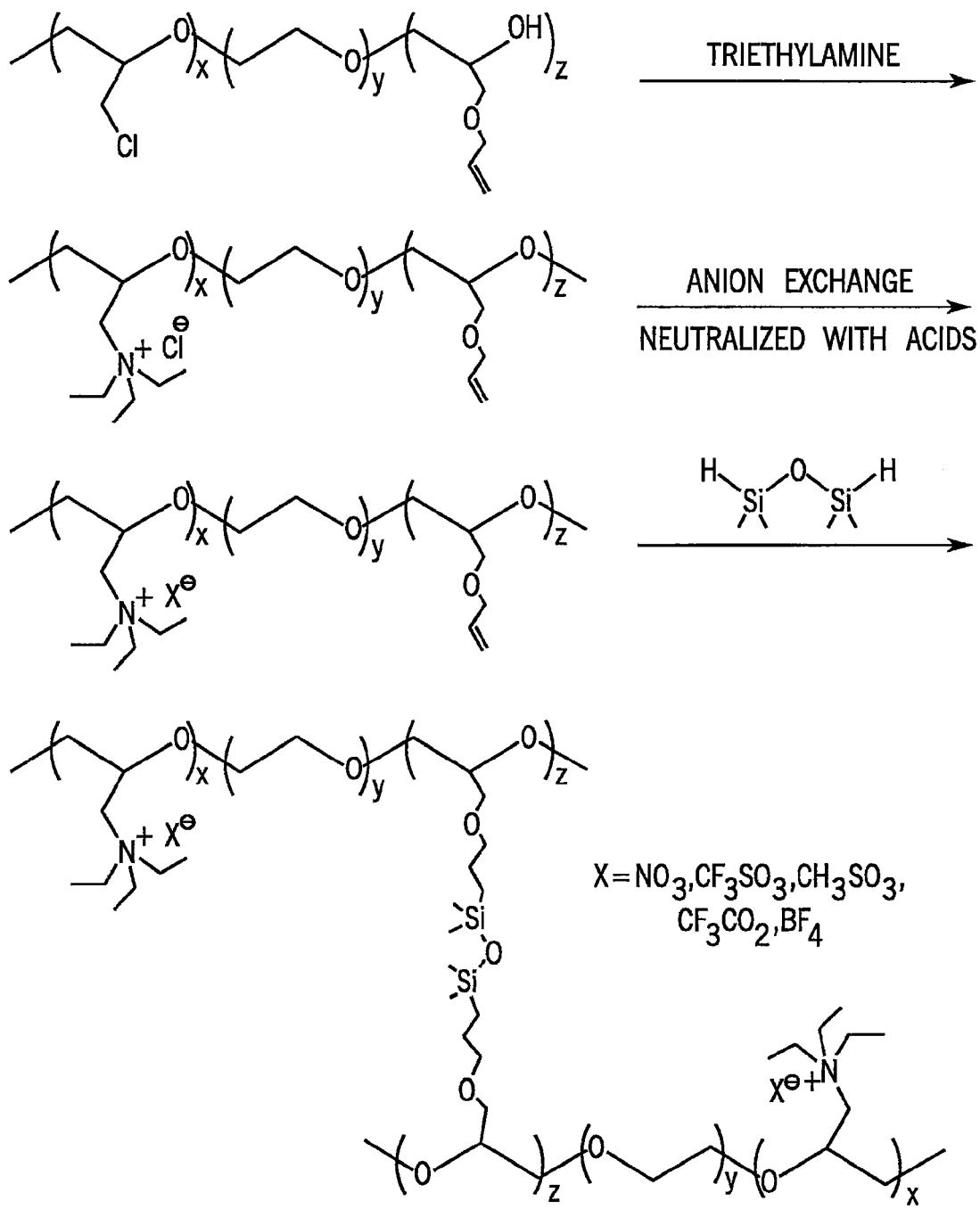
FIG. 12 is a schematic of a cross-linked polyether having pendant ammonium salts.

The proton-conducting polymer membrane of FIG. 12 was prepared by dissolving 30 g poly(epichlorohydrin-co-ethylene oxide-co-allyl glycidyl ether) in dry dimethyl formamide (DMF), which was made of a solution of total 478 g, (30/478). 159 g of such solution (10 g polymer, 0.081 mole of chlorine (Cl)) was charged into a three-neck flask and triethylamine (8.18 g, 11.3 ml, 0.081 mole) was added to the solution under stirring. The solution was heated at 60° C. overnight. The solution was then passed through an anion exchange resin and different aliquot solutions were neutralized with different acid to neutral. Solvent was removed and the material was dried in the vacuum oven at 60° C. with $P_2O_5$ for two days. The dried material was dissolved in dry DMF or THF and a calculated amount of crosslinker such as 1,1,3,3-tetramethyldisiloxane and a catalyst was added. The homogenous solution was cast into a Teflon dish inside the solvent drybox and solvent was removed. The dried film was heated to 60° C. for one day to complete the crosslinking. Different amounts of ionic liquids were used to swell the membranes and the obtained plasticized membrane was used to measure ionic conductivity. To prepare in situ membranes with ionic liquids, the crosslinker, catalyst, and ionic liquids were added to the polymer solution and the homogenous solution was placed in a Teflon dish inside a solvent drybox and solvent was removed. The dried film was heated to 60° C. for one day to complete the crosslinking.

Synthesis Example 5

Figure 13A:
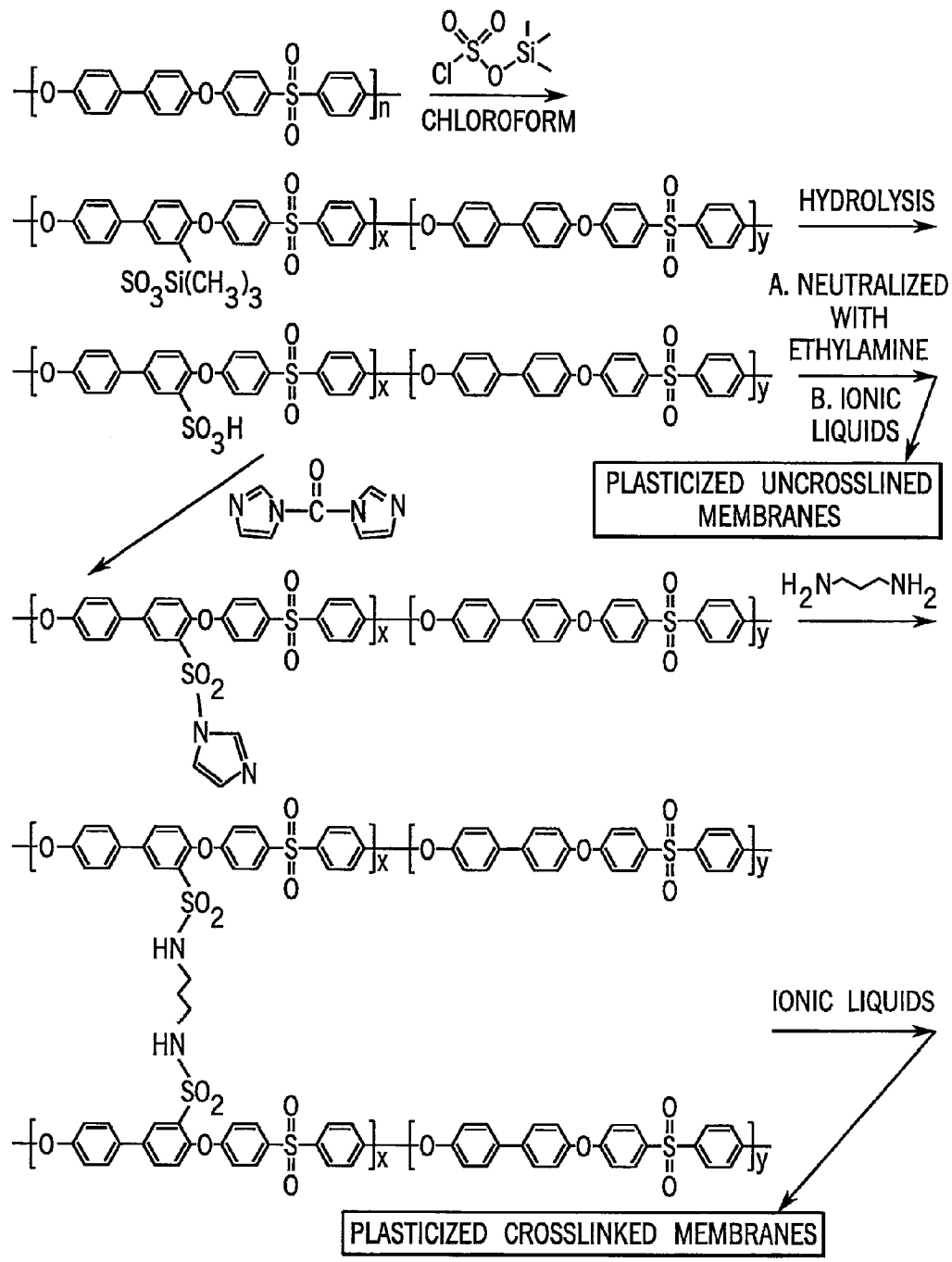
FIG. 13A is a schematic depiction of uncrosslinked and crosslinked polphenylsulfones.

The proton-conducting polymer membrane of FIG. 13A was prepared by adding chlorosulfonic acid (67 ml) to a solution of chlorotrimethylsilane (141 ml) in 300 ml dry 1,2-dichloroethane. The solution was stirred at 60° C. overnight and solvent was removed. The residual was distilled and 142.2 g product (chlorotrimethylsulfonate) was obtained, a yield of 75%.

Polysulfone (30 g) was dissolved in 300 ml dry chloroform and chlorotrimethylsulfonate (50 g) was added to the solution at room temperature under a nitrogen purge. The reaction was continued at 60° C. overnight. The polymer floated to the surface of the solvent. Solvent was removed and the polymer was washed by methanol, hot water, and cold water several times. The material was dried in an oven at 80° C. with $P_2O_5$ for three days. The yield was 28 g. The calculated sulfonation degree, measured by nuclear magnetic resonance (NMR) spectroscopy was 76% mole and the ion exchange capacity (IEC) determined by titration was 5.3 meq.g$^{-1}$.

Uncrosslinked and crosslinked membranes were then formed as described below.

(a) Uncrosslinked Polysulfone Membranes (i) Acidic Membranes

The sulfonated polyphenylsulfone was dissolved in DMF and mixed with different amounts of phosphoric acid or triflic acid/$H_2O$ (1/1, in molar) and solvent was removed to leave a self-standing membrane with imbibed acids.

(ii) Neutral Membranes with Ionic Liquids

The sulfonated polyphenylsulfone was dissolved in DMF and neutralized with ethylamine and then mixed with different amounts of ionic liquid and placed in Teflon dishes. Solvent and water were removed completely to obtain films for ionic conductivity measurement.

(b) Crosslinked Polysulfone Membranes

Crosslinked polysulfone was obtained according to standard procedures. The sulfonated polysulfone was dissolved in DMF and reacted with calculated amounts of carbonyldiimidazole. When the gas evolution ceased, different amounts of 1,3-diaminopropane were added. The solution was cast in Teflon dishes and solvent was removed to form self-standing membranes. The crosslinked membranes were then swelled by addition of ionic liquids. Ionic conductivity was measured for the resulting membranes.

To prepare in situ membranes with ionic liquids, after gas evolution ceased different amounts of 1,3-diaminopropane and ionic liquids were added to the polymer solution and then the homogenous solution was cast into a Teflon dish inside the solvent drybox. Solvent was removed to obtain the self-standing membranes with imbibed ionic liquids.

Synthesis Example 6

Figure 13B:
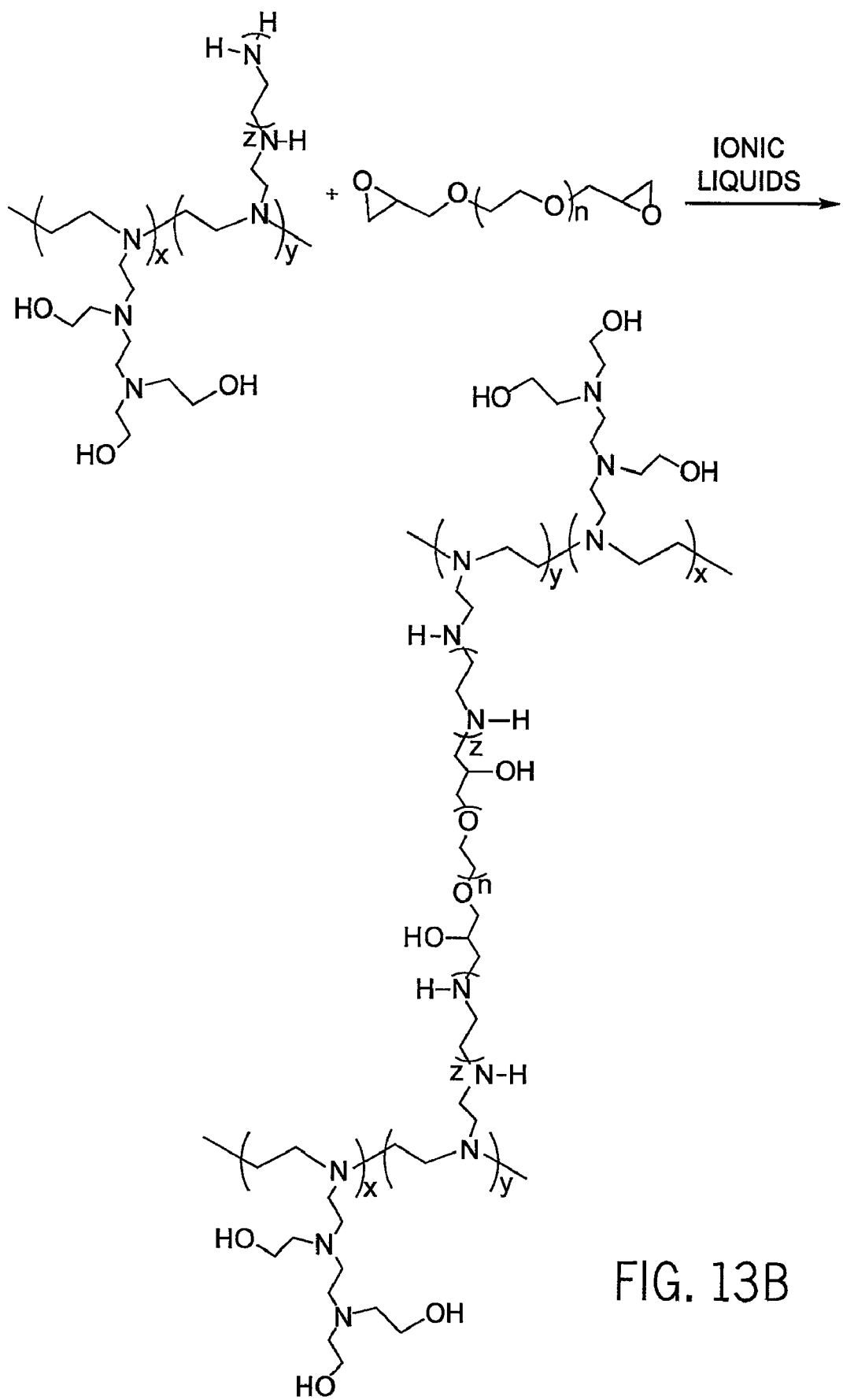
FIG. 13B is a schematic depiction of a crosslinked polyethylenimine membrane with ionic liquids.

The proton-conducting polymer membrane of FIG. 13B was prepared by treating a commercial polymer solution (water based solution) by removing water completely. A calculated amount of dry polymer was then dissolved in dry methanol and 20 wt % polyethylene glycol diglycidyl ether (relative to the weight of dry polymer) and different amounts of ionic liquids were added. The solution was stirred for approximately ten minutes before casting into a Teflon dish within an oven. Under the protection of dry nitrogen the oven was heated to 70-80° C. overnight and was then held under vacuum at the same temperature for two days to obtain the self-standing membranes with ionic liquids.

Figure 14A:
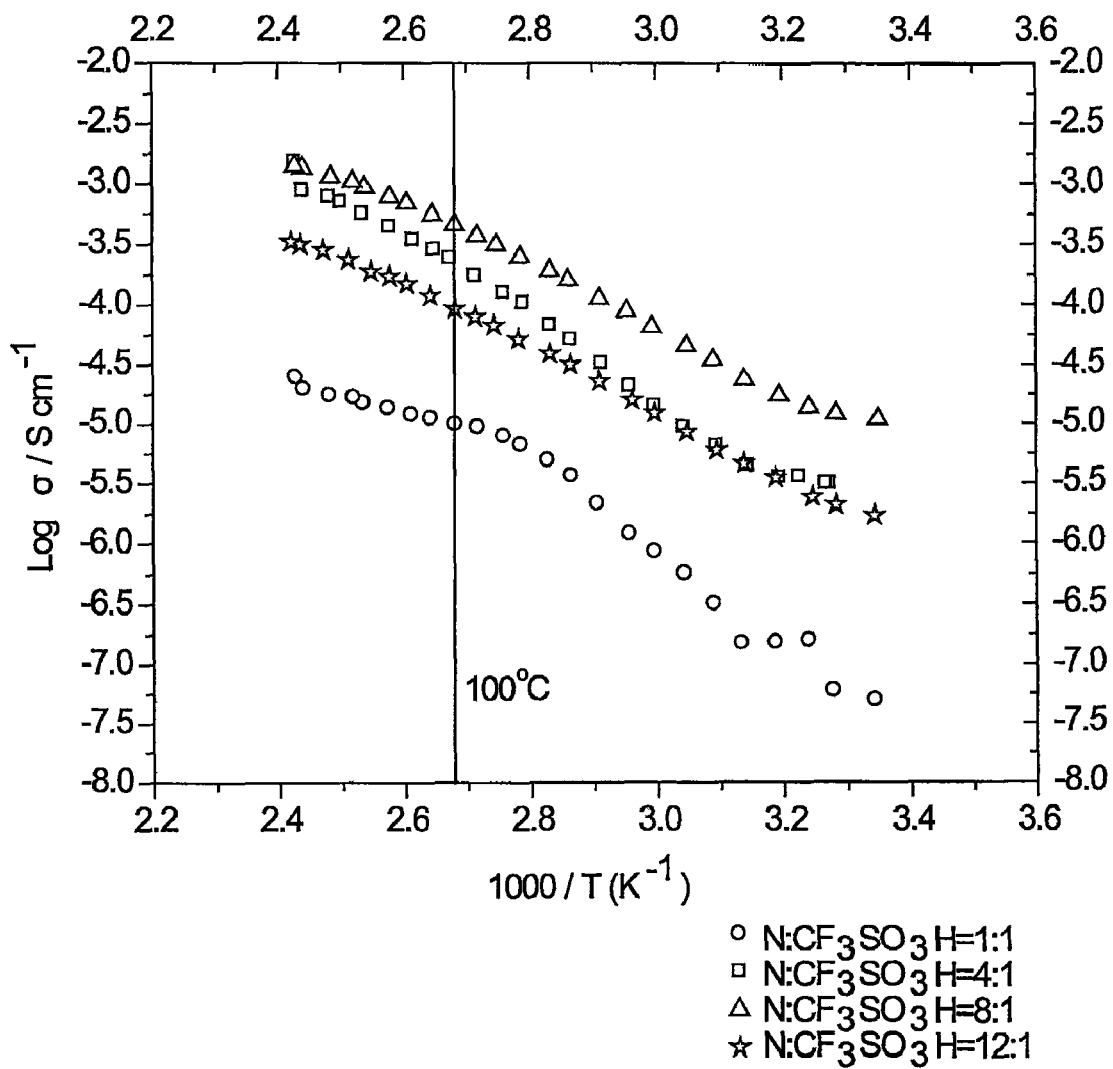
FIG. 14A is a graph of ionic conductivity of linear poly(3-aminopropylmethylsiloxane)s with varying degrees of doping by trifluoromethanesulfonic acid.
Figure 14B:
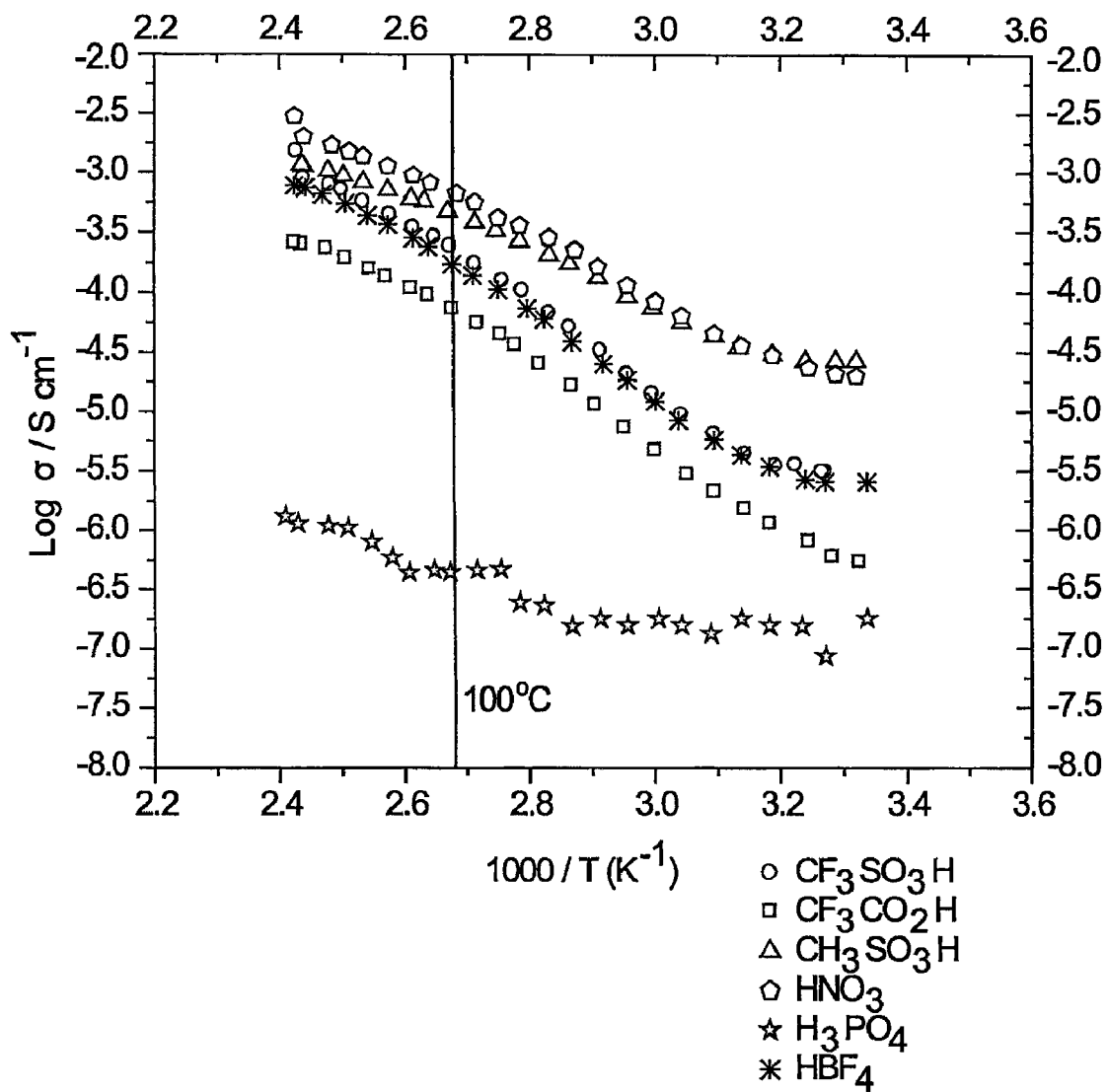
FIG. 14B is a graph of ionic conductivity of linear poly(3-aminopropylmethylsiloxane)s having the same doping level of N:Acid=4:1 but with different acids.
Figure 15:
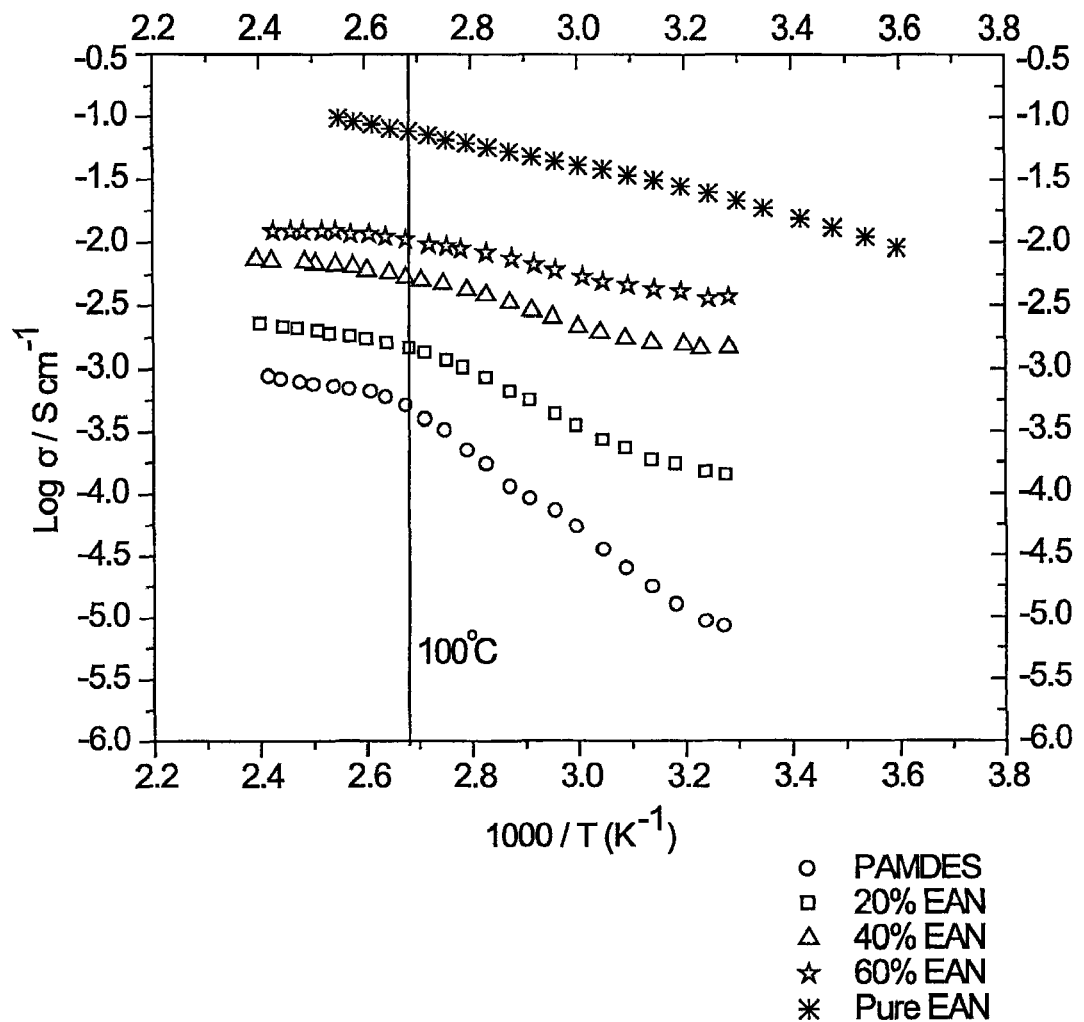
FIG. 15 is a graph of ionic conductivity of linear poly(3-aminoproplysiloxane) gels having pendant ammonium nitrate and different amounts of ethyl ammonium nitrate (EAN)
Figure 16:
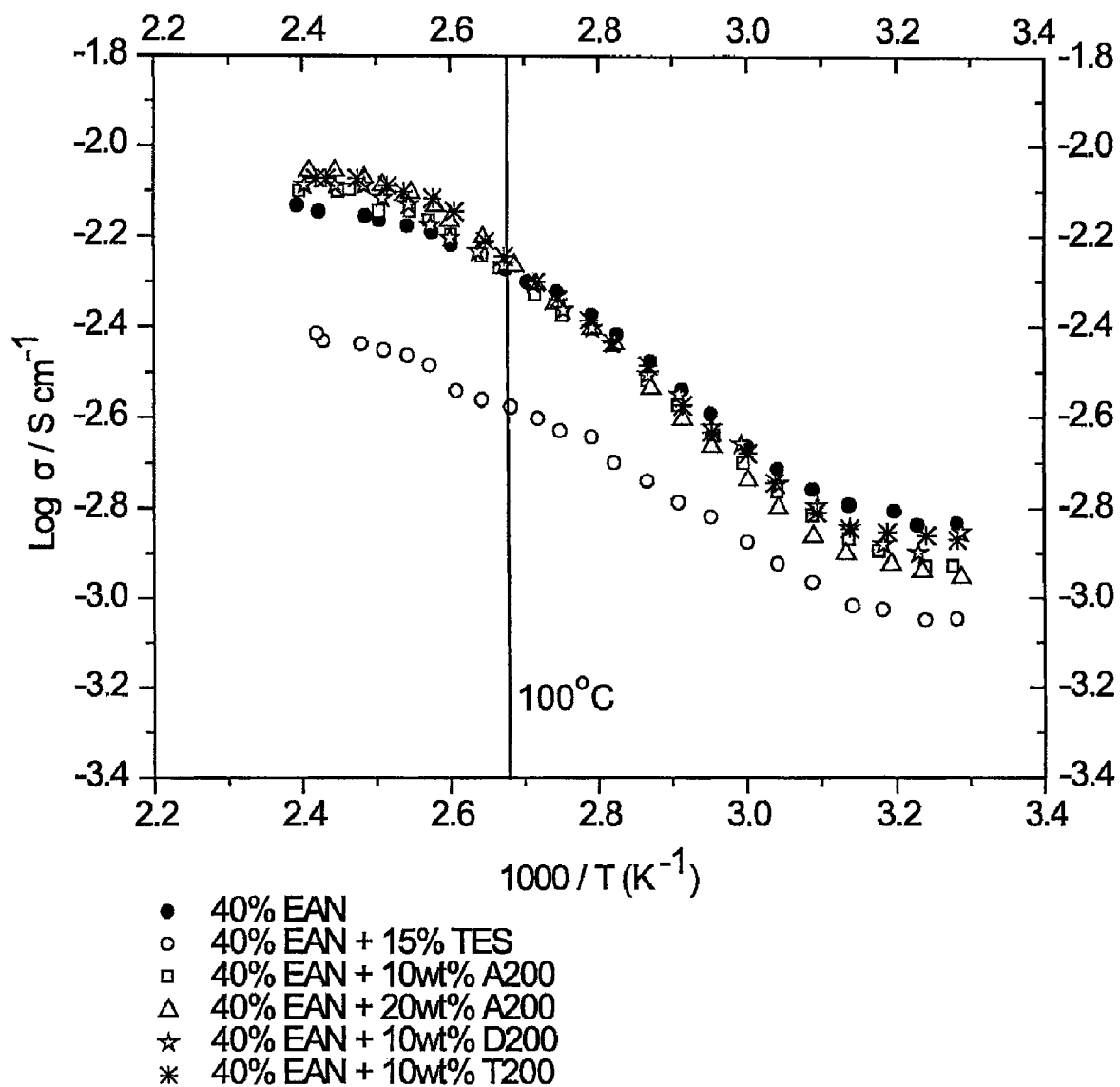
FIG. 16 is a graph of ionic conductivity of linear poly(3-aminoproplysiloxane) gels containing 40 wt % EAN and different amounts of fumed silica.

The ionic conductivity of the proton-conducting polymer membranes was evaluated. The results are shown in FIGS. 14 through 16 with respect to the linear polysiloxanes. FIG. 14A shows the ionic conductivity of linear polysiloxanes with different degrees of doping by trifluoromethanesulfonic acid. When the acid doping was equivalent to neutral, i.e., N:$CF_3SO_3H$=1:1, the product was a powder and demonstrated the lowest ionic conductivity; when less acid was doped the obtained materials were free standing films and their ionic conductivities were much higher than the fully doped one. As shown in FIG. 14A, the highest ionic conductivity was obtained when the acid doping level was equivalent to N:$CF_3SO_3H$=8:1. FIG. 14B compares the ionic conductivities of the linear polysiloxane having the same doping level of N:Acid=4:1 but with different acids. FIG. 15 shows the ionic conductivity of linear ammoniated polysiloxanes (doping level N:$HNO_3$=1:1) containing different amounts of EAN. Without EAN, the membranes conducted poorly ($10^{-3.5}$ S/cm) but by increasing EAN content, the conductivity increased by decades. FIG. 16 shows the ionic conductivity of linear ammoniated polysiloxanes containing 40 wt % EAN and different amounts of unmodified (A200) or modified fumed silica (D200 and T200). The conductivity was insensitive to the nature of amination (D200 and T200), hydroxylation (A200) or amount of $SiO_2$, though the compressional modulus changed greatly.

Figure 17:
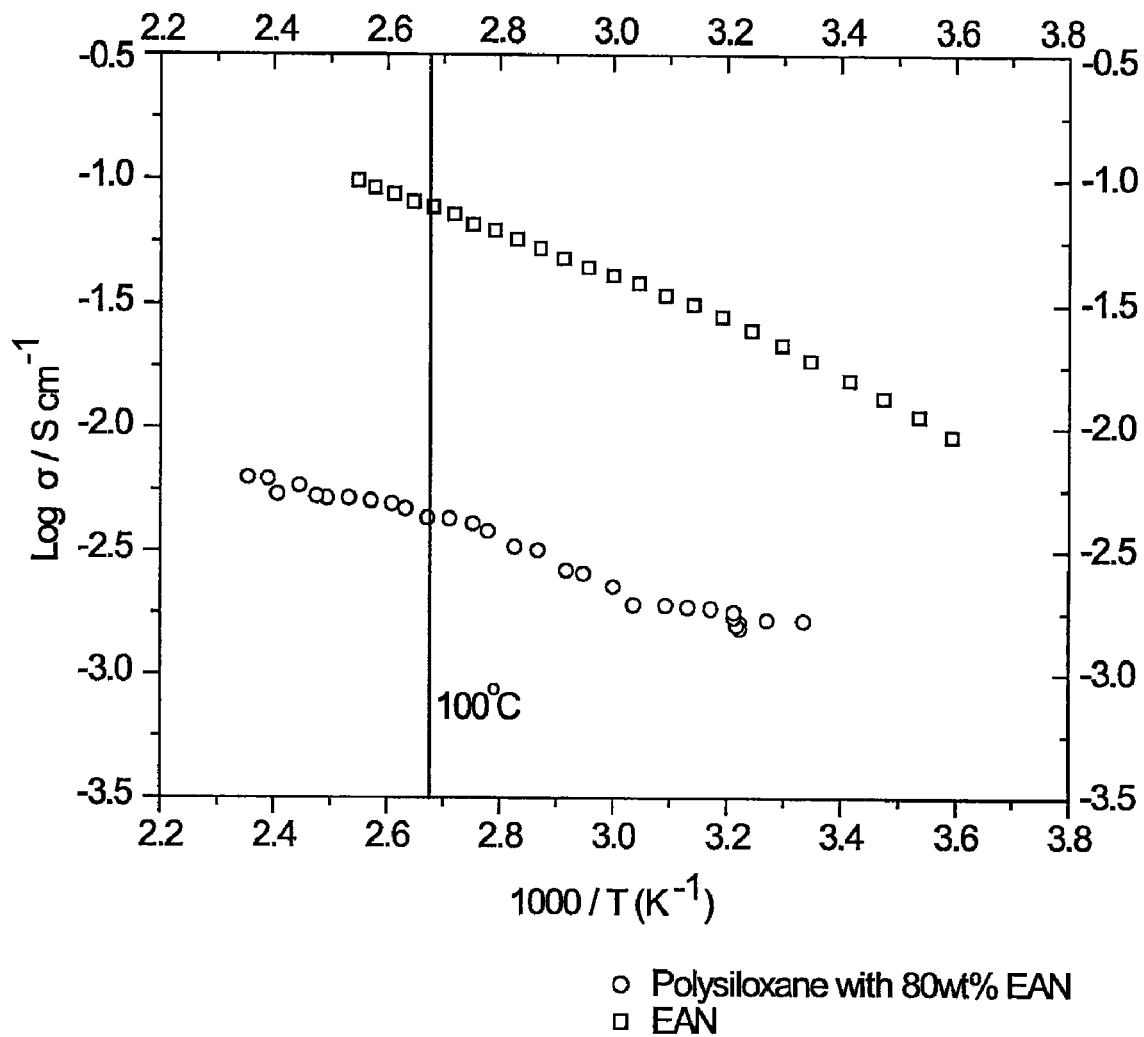
FIG. 17 is a graph of ionic conductivity of crosslinked polysiloxane gels having pendant amine group and 80% wt BAN.
Figure 18:
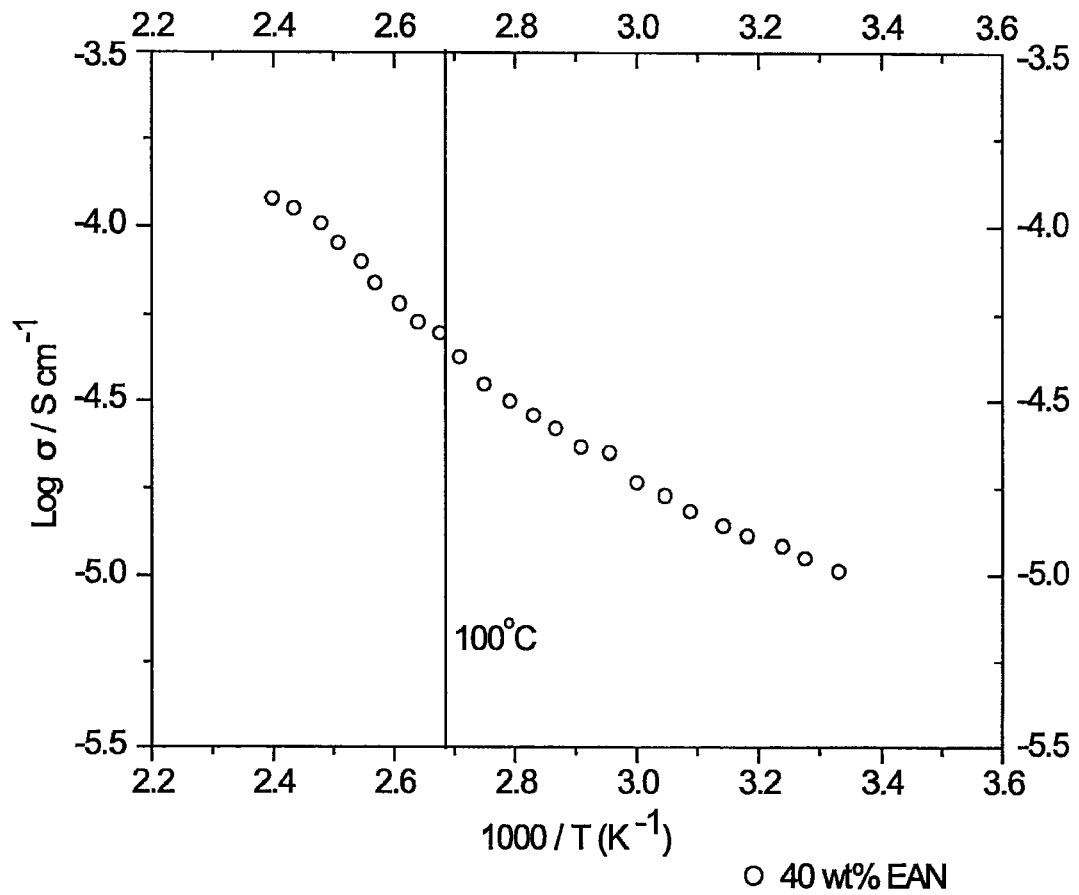
FIG. 18 is a graph of ionic conductivity of crosslinked polyethers containing 40 wt % EAN.
Figure 19:
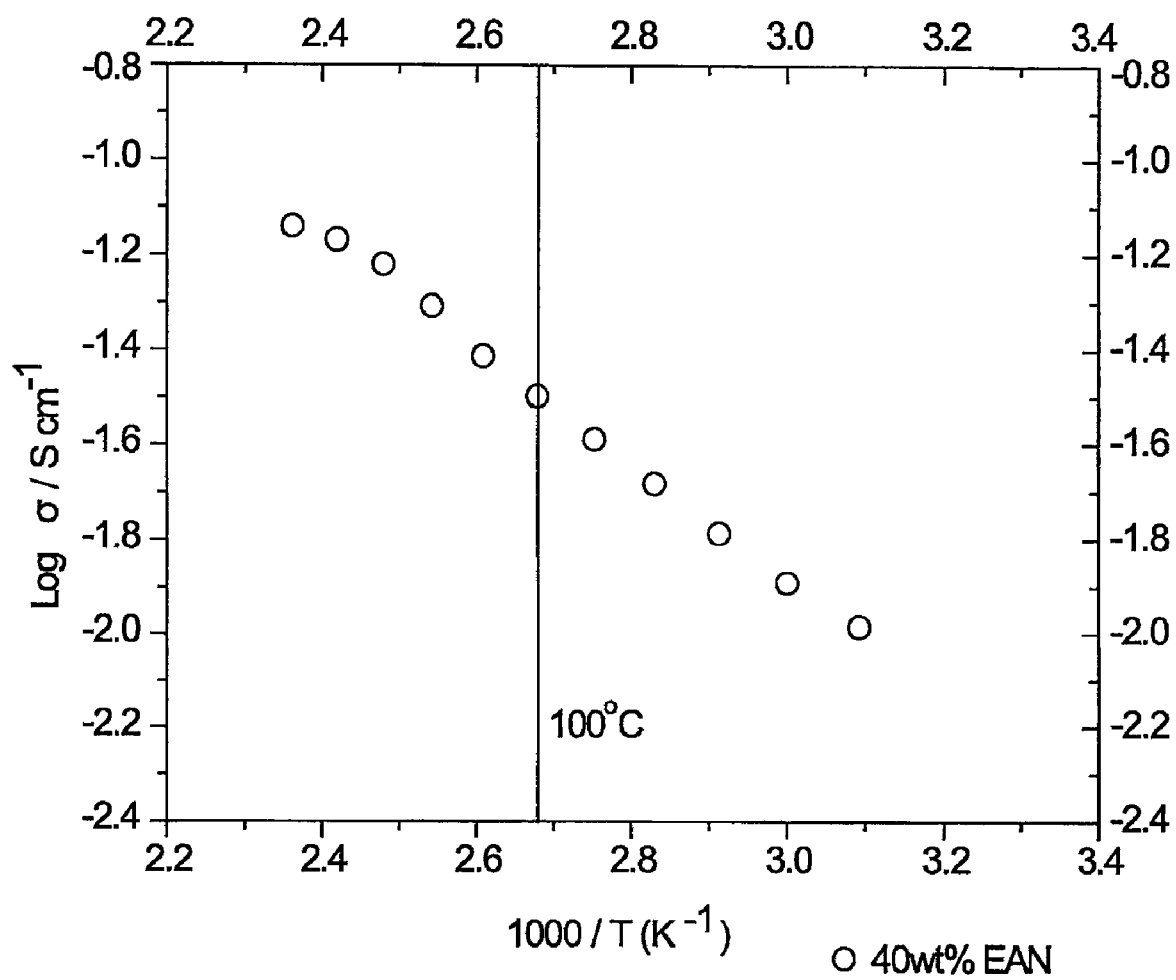
FIG. 19 is a graph of ionic conductivity of crosslinked hydroxylated polymethacrylate containing 40 wt % EAN.
Figure 20:
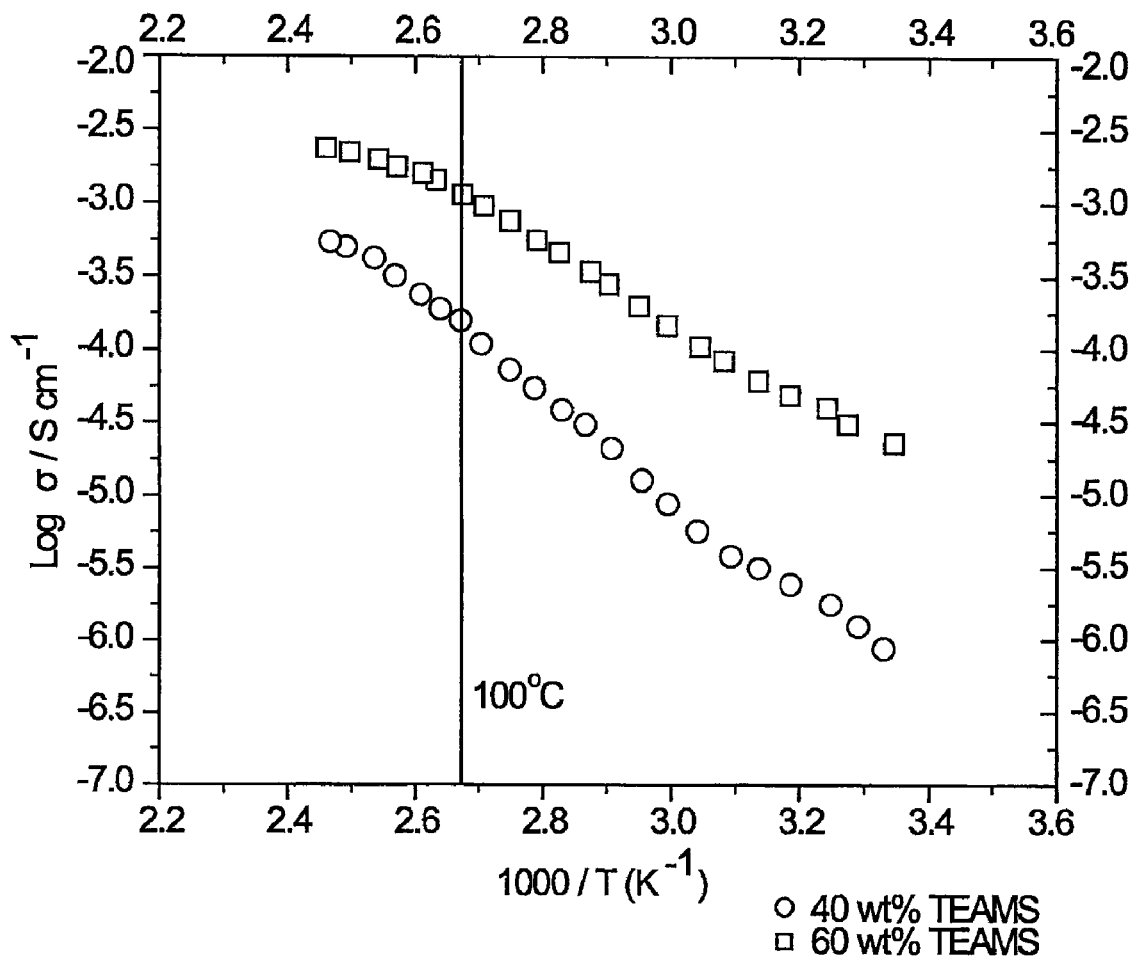
FIG. 20 is a graph of ionic conductivity of crosslinked hydroxylated polyethylenimine containing different amounts of (triethylammonium methanesulfonate) TEAMS.
Figure 21:
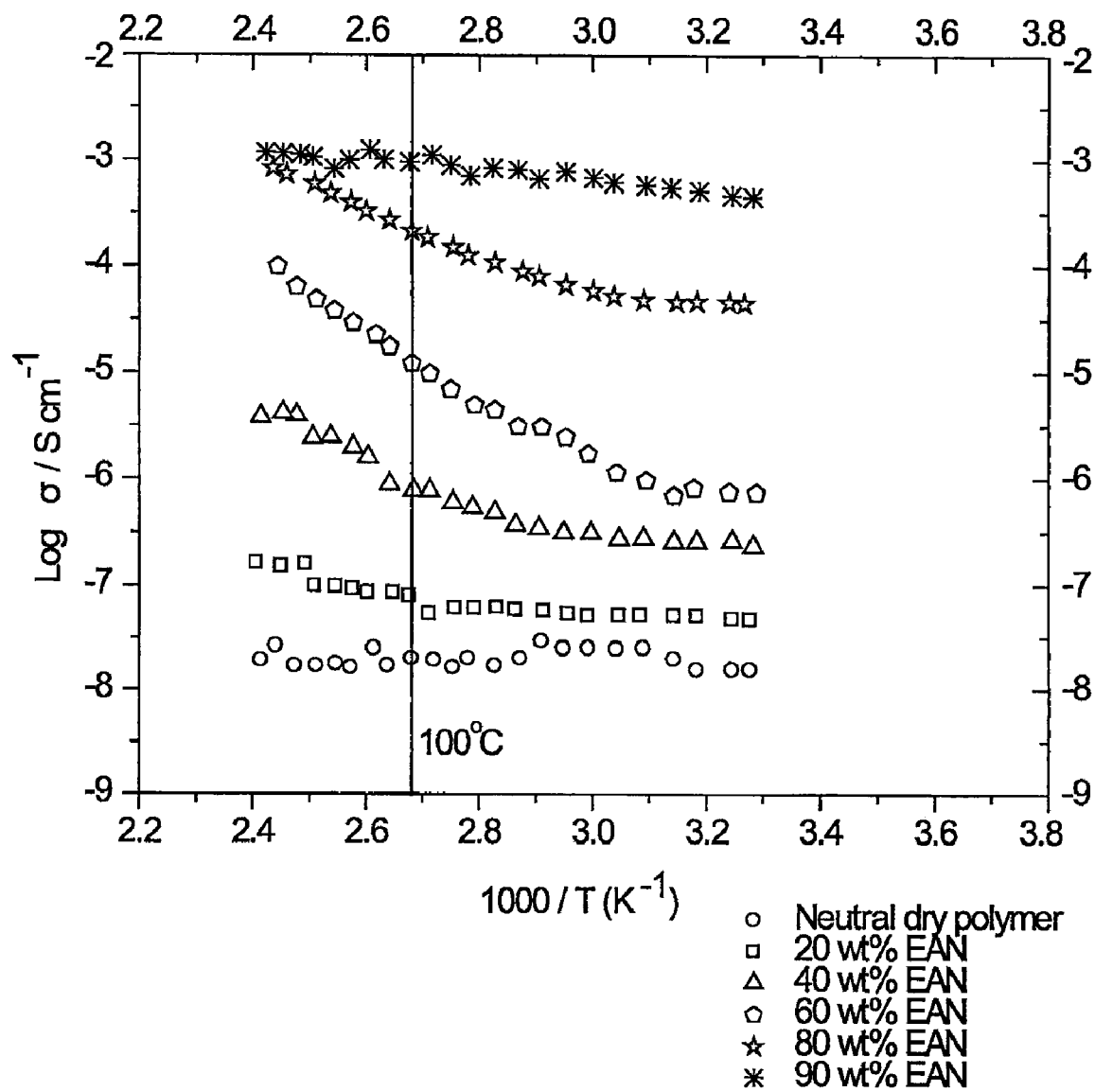
FIG. 21 is a graph of ionic conductivity of ethylamine neutralized sulfonic polysulfones with different amounts of EAN.
Figure 22:
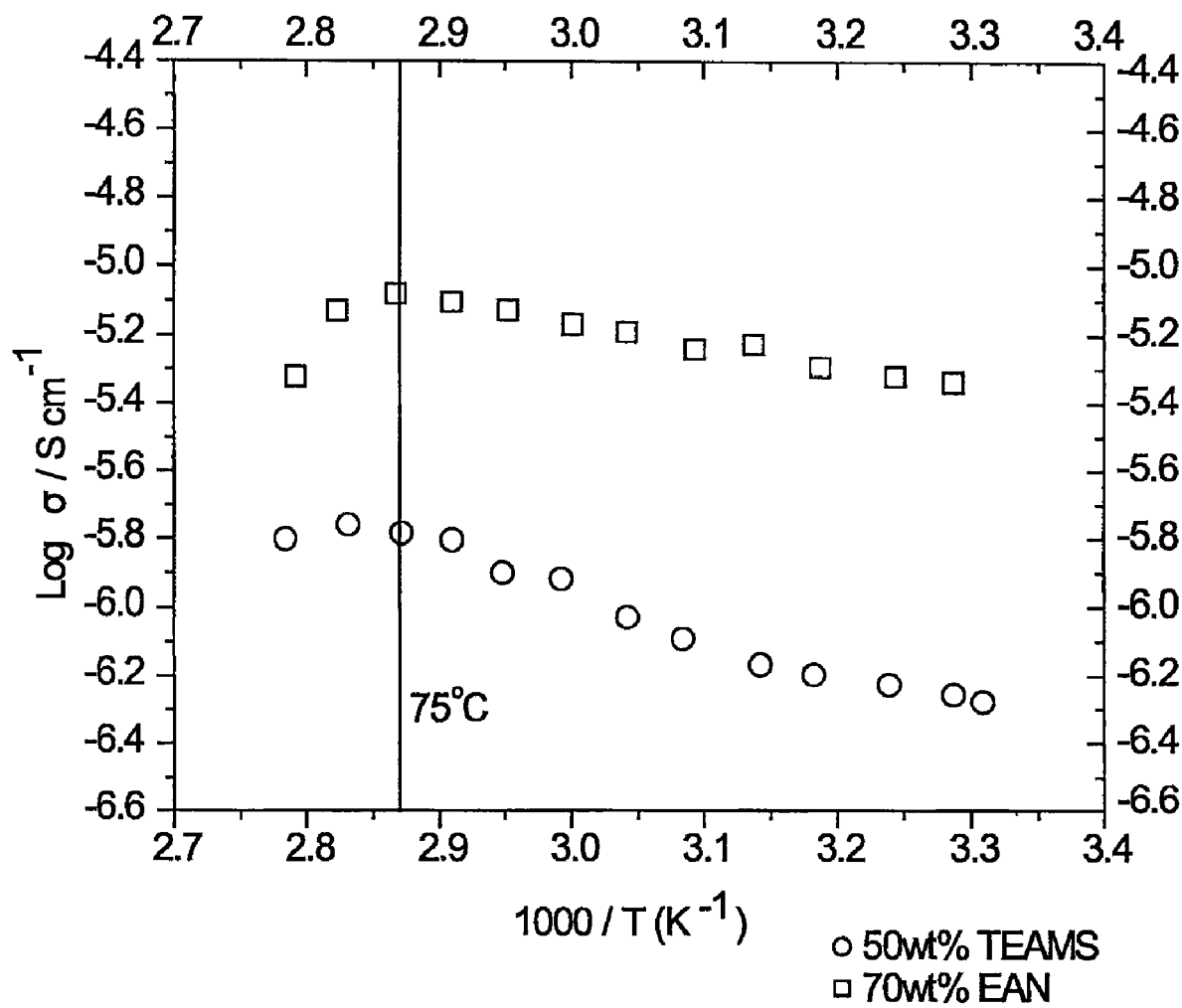
FIG. 22 is a graph of ionic conductivity of polybenzimidazole (PBI) containing different amounts of ionic liquids.

Crosslinking the polymer (with 15 wt % tetraethoxysilane [TES]), added mechanical rigidity, making freestanding films possible, but lowered the ionic conductivity considerably. A crosslinked polysiloxane was synthesized and imbibed with 80 wt % EAN. FIG. 17 shows that the ionic conductivity of this composite membrane was a decade lower than pure EAN and the same as uncrosslinked polysiloxane containing only half the amount of EAN (40 wt %). Restricted chain mobility from crosslinking offset the effects of higher EAN content.

Synthesis Example 7

Crosslinked membranes were synthesized with crosslinked polyethers, hydroxylated polymethacrylate and hydroxylated polyethylenimine having medium glass transition temperatures ($T_g$), and polyphenyl sulfone having a high $T_g$ (192° C.) and polybezenimidazole with a much higher $T_g$ (typically over approximately 400° C.). The ionic conductivity of the IL absorbed polymer membranes was measured. The results are shown in FIGS. 18-22.

Synthesis Example 8

Crosslinked ammoniated polysiloxanes with ionic liquid and nanoparticles were prepared by mixing 100 g N-(2-aminoethyl)-3-aminopropyl-methyldimethoxysilane (100 g) with 100 ml $H_2O$. The solution was stirred at 60-70° C. for three days. This mother solution was used for the following preparations.

(a) Uncrosslinked Ammoniated Polysiloxane

Figure 23:
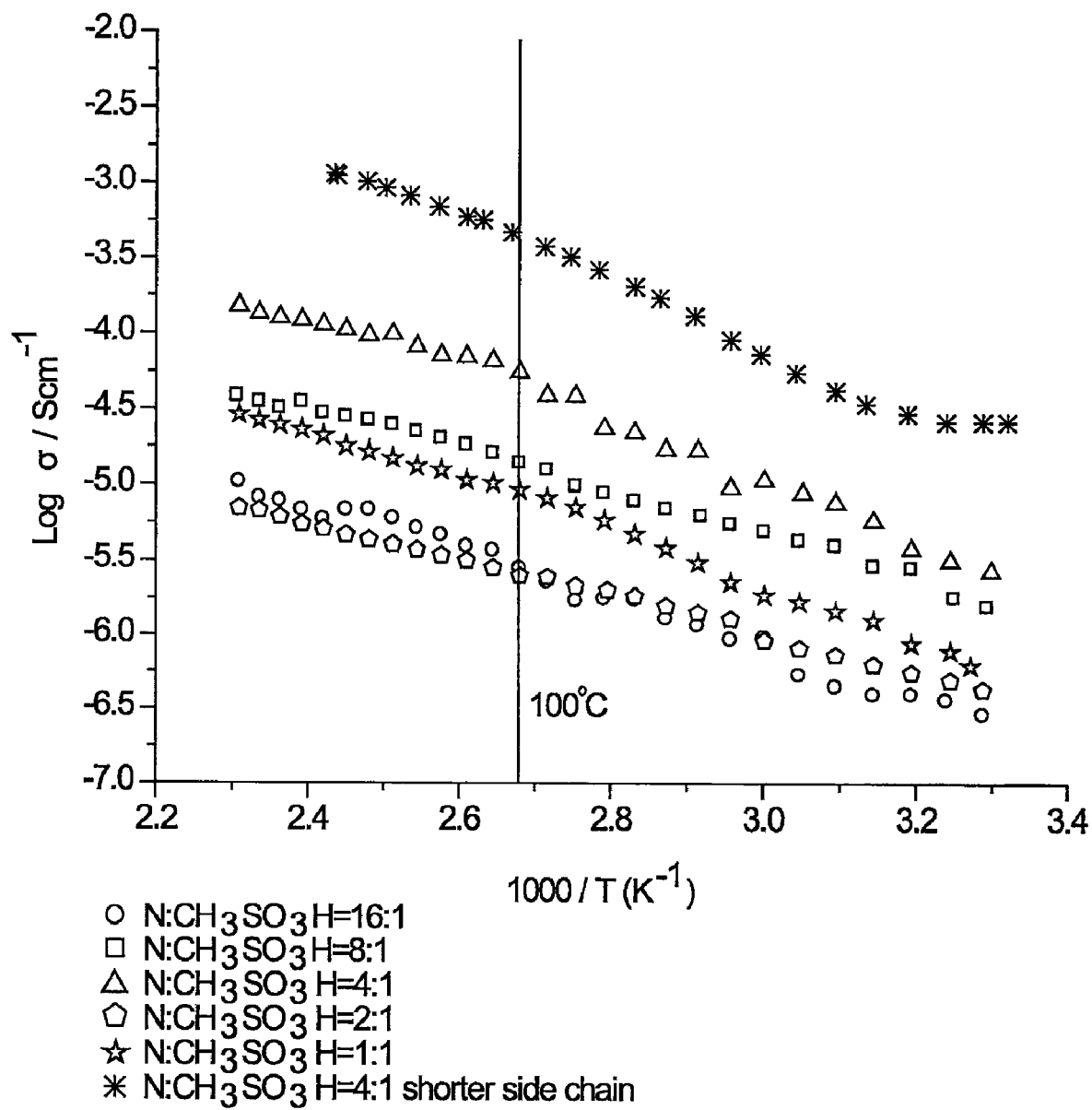
FIG. 23 is an Arrhenius plot of conductivity of poly(N-2-aminoethyl)-3-aminopropyl-methylsiloxane) containing variable proportions of methanesulfonic acid.

To prepare uncrosslinked membranes 10 g of the mother solution was neutralized with different amounts of methanesulfonic acid. The solutions were then cast on Teflon dishes and solvent was removed slowly. Finally, the films were dried in a vacuum oven at 80° C. with $P_2O_5$ for two days. The conductivities of those films are shown in FIG. 23.

(b) Crosslinked Ammoniated Polysiloxane

NaH (5.28 g, 0.22 mole) was charged into a dry flask under the protection of nitrogen and THF was added to the flask. The slurry was stirred at 70° C. while 0.2 mole oligoethylene glycols (such as diethylene glycol, triethylene glycol, tetraethylene glycol, PEG200, PEG300 and PEG400 etc) were added. The solution was refluxed overnight to make sure all the terminal hydroxyl group reacted. The solution was cooled to room temperature and allyl bromide (0.2 mole) was added slowly. The solution was then refluxed overnight, after which the reaction mixture was poured onto ice and was extracted with ether three times (150 ml×3). The organic layer was combined and dried over $MgSO_4$. The solution was filtered and concentrated and oligoethylene glycol diallyl ethers were obtained with a yield of 85%.

Calculated amounts of oligoethylene glycol diallyl ethers, Pt catalyst (0.2% of allyl group) and THF were charged into the dry flask under the protection of $N_2$. The solution was stirred at 70° C. under the protection of $N_2$ for one hour before slow addition of triethoxysilane. The reaction was continued at 70° C. until the signal of allyl group was disappeared as evidenced by $^1$HNMR. When the reaction was finished, activated carbon was added to the solution, which was refluxed for four hours before it was filtrated and concentrated to obtain the crosslinker, oligo(ethylene glycol) bis(triethoxysilane). Crosslinker solution was obtained by mixing 15 wt % of tetraethoxysilane and 85 wt % of oligo(ethylene glycol) bis(triethoxysilane).

Figure 24:
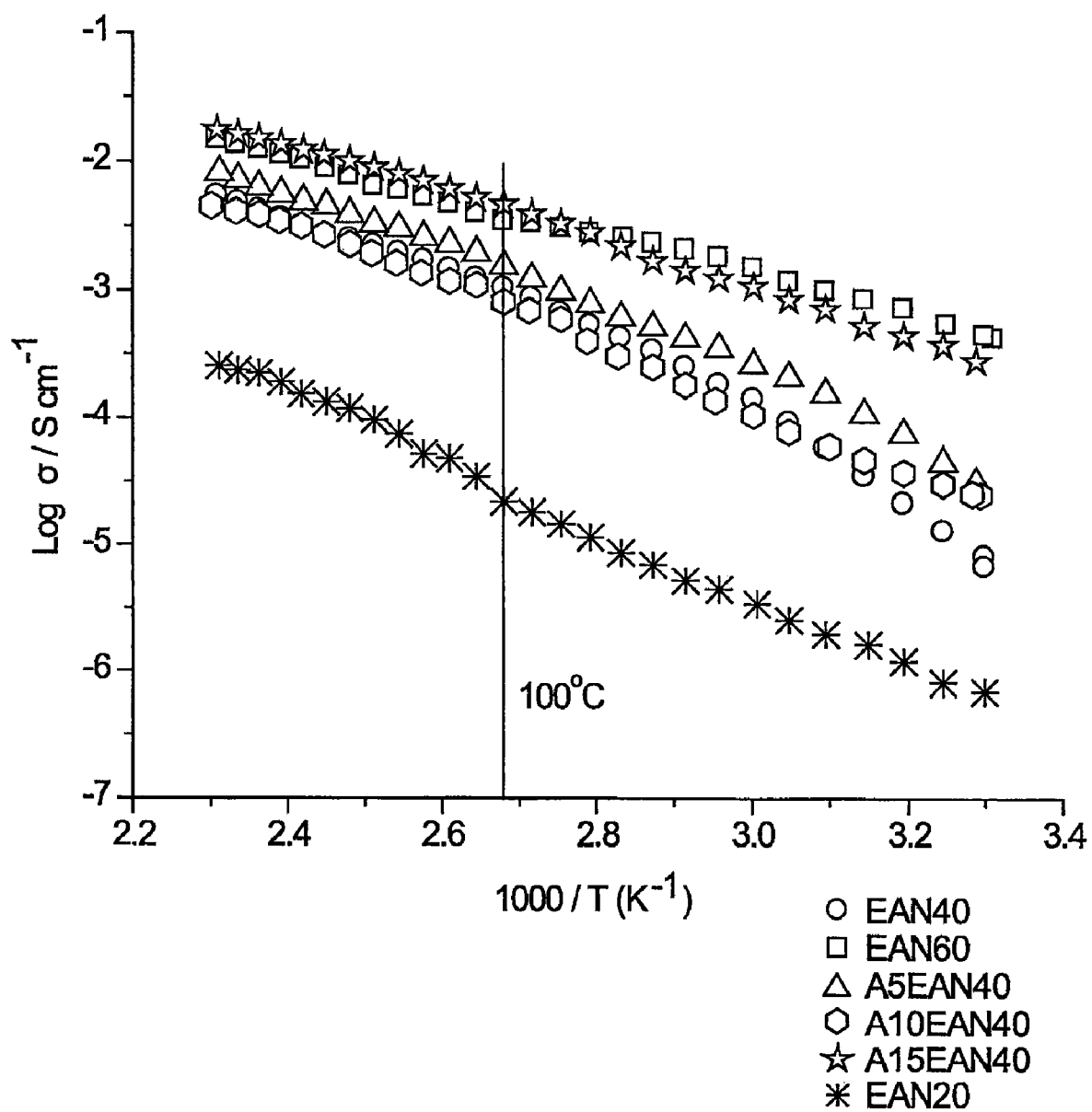
FIG. 24 is a graph illustrating the ionic conductivity of crosslinked poly(N-2-aminoethyl)-3-aminopropyl-methylsiloxane) doped with methanesulfonic acid at the ratio of terminal $NH_2$:$CH_3SO_3H$=4:1 and containing different amounts of EAN and fumed silica A200.

To prepare crosslinked membranes 5 g of the above mother solution was neutralized with 0.5 g methanesulfonic acid, which corresponds to a ratio of terminal $NH_2:CH_3SO_3H$ equal to 4:1. Then calculated amounts of crosslinker solution, ionic liquid (EAN), and fumed silica (A200) were added to the solutions and thoroughly mixed before casting into a Teflon dish. Solvent was removed slowly and finally the films were dried in a vacuum oven at 80° with $P_2O_5$ for two days. The conductivities of those films are shown in FIG. 24.

As set forth in the present invention, a goal for fuel cell membranes is a stable and highly conductive membrane with ionic groups covalently linked to the membrane. Stability can be improved by using a backbone made from polysiloxane or other suitable polymer materials, which can be crosslinked for film strength, and can be combined with amines or other materials for high ionic liquid content for high ionic conductivity of the membrane. EAN is a typical IL that is used in fuel cells. However, other ILs that may have higher stability, such as fluorinated ILs, TEAMS or the like also may be used.

What is claimed is:

1. A polymer electrolyte membrane for use in a fuel cell, comprising:
a proton-conducting polymer of a general formula:

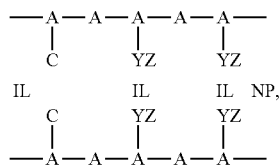

wherein a repeating unit A is a polymer, C is an endgroup, YZ is a neutralized couple, IL is an ionic liquid, and NP is nanoparticles.

2. The polymer electrolyte membrane of claim 1, wherein the repeating unit A is selected from the group consisting of: polysiloxane, poly(ethylelene oxide), polyacrylate, polymethacrylate, polysulfone, polyethylenimine, and polybenzylimidazole.

3. The polymer electrolyte membrane of claim 1, wherein the endgroup C is selected from the group consisting of: hydroxyl, amine, and imine-containing chemical moieties.

4. The polymer electrolyte membrane of claim 1, wherein the neutralized couple YZ is prepared by reacting an acid with a base, wherein Y is a base selected from the group consisting of: chemical moieties containing a chemical base group of nitrogen, phosphorus, oxygen or sulfer so that a backbone chain of the polymer forms a polybase and Z is an acid selected from the group consisting of: hydrofluoric acid, trifluoromethanesulfonic acid, methanesulfonic acid, monofluorophosphoric acid, trifluoroacetic acid, nitric acid, phosphoric acid, difluorophosphoric acid, tetrafluoroboric acid, hydrogen bis(trifluoromethanesulfonyl)imide, and hydrogen bis(perfluoroethanesulfonyl)imide.

5. The polymer electrolyte membrane of claim 1, wherein the neutralized couple YZ is prepared by reacting an acid with a base, wherein Y is an acid selected from the group consisting of: hydrofluoric acid, trifluoromethanesulfonic acid, methanesulfonic acid, monofluorophosphoric acid, trifluoroacetic acid, nitric acid, phosphoric acid, difluorophosphoric acid, tetrafluoroboric acid, hydrogen bis(trifluoromethanesulfonyl)imide, and hydrogen bis(perfluoroethanesulfonyl) imide so that a backbone chain of the polymer forms a polyacid and Z is a base selected from the group consisting of: chemical moieties containing a chemical base group of nitrogen, phosphorus, oxygen or sulfer.

6. The polymer electrolyte membrane of claim 1, wherein the ionic liquid IL is a neutral protic-salt ionic liquid.

7. The polymer electrolyte membrane of claim 1, wherein the ionic liquid IL is a mixture of ionic liquids consisting of at least one neutral protic-salt ionic liquid.

8. The polymer electrolyte membrane of claim 6, wherein the ionic liquid IL is a neutral product of an acid and a base for which a proton transfer energy lies in the range between 0.5-1.5 eV.

9. The polymer electrolyte membrane of claim 8, wherein the base is selected from the group consisting of fluorinated hydrocarbons and the acid is selected from the group consisting of acids having a pKa in the range between −5 and −17.

10. The polymer electrolyte membrane of claim 9, wherein the base is selected from the group consisting of: $CF_3NH_2$, $(CF_3)_2NH$, $CF_3CF_2NH_2$, $(CF_3CF_2)_2NH$, 2,4,5-trifluoro-imidazole, and $CF_3SO_2NH_2$ and the acid is selected from the group consisting of: trifluoromethane sulfonic acid, bistrifluoromethanesulforimide, sulfuric acid, monofluorophosphoric acid, difluorophosphoric acid, tetrafluoroboric acid, hydrogen bis(trifluoromethanesulfonyl)imide, and hydrogen bis(perfluoroethanesulfonyl)imide.

11. The polymer electrolyte membrane of claim 10, further including crosslinker chains B of a general formula:

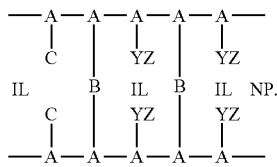

12. The polymer electrolyte membrane of claim 8, wherein the base and the acid are selected from the group consisting of ammonium salts.

13. The polymer electrolyte membrane of claim 1, wherein the nanoparticles NP are selected from the group consisting of: modified fumed silica, unmodified fumed silica, titanium oxide, and aluminum oxide.

14. The polymer electrolyte membrane of claim 1, further including crosslinker chains B of a general formula:

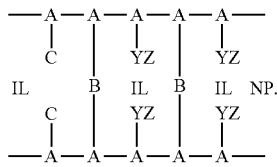

15. The polymer electrolyte membrane of claim 14, wherein the crosslinker chains B is selected from the group consisting of: alkane chains and poly(ethylene oxide).

16. The polymer electrolyte membrane of claim 14, wherein the repeating unit A is selected from the group consisting of: polysiloxane, poly(ethylelene oxide), polyacrylate, polymethacrylate, polysulfone, polyethylenimine, and polybenzylimidazole.

17. The polymer electrolyte membrane of claim 14, wherein the endgroup C is selected from the group consisting of: hydroxyl, amine, and imine-containing chemical moieties.

18. The polymer electrolyte membrane of claim 14, wherein the neutralized couple YZ is prepared by reacting an acid with a base, wherein Y is a base selected from the group consisting of: chemical moieties containing a chemical base group of nitrogen, phosphorus, oxygen or sulfer so that a backbone chain of the polymer forms a polybase and Z is an acid selected from the group consisting of: hydrofluoric acid, trifluoromethanesulfonic acid, methanesulfonic acid, monofluorophosphoric acid, trifluoroacetic acid, nitric acid, phosphoric acid, difluorophosphoric acid, tetrafluoroboric acid, hydrogen bis(trifluoromethanesulfonyl)imide, and hydrogen bis(perfluoroethanesulfonyl)imide.

19. The polymer electrolyte membrane of claim 14, wherein the neutralized couple YZ is prepared by reacting an acid with a base, wherein Y is an acid selected from the group consisting of: hydrofluoric acid, trifluoromethanesulfonic acid, methanesulfonic acid, monofluorophosphoric acid, trifluoroacetic acid, nitric acid, phosphoric acid, difluorophosphoric acid, tetrafluoroboric acid, hydrogen bis(trifluoromethanesulfonyl)imide, and hydrogen bis(perfluoroethanesulfonyl)imide so that a backbone chain of the polymer forms a polyacid and Z is a base selected from the group consisting of: chemical moieties containing a chemical base group of nitrogen, phosphorus, oxygen or sulfer.

20. The polymer electrolyte membrane of claim 14, wherein the ionic liquid IL is a neutral protic-salt ionic liquid.

21. The polymer electrolyte membrane of claim 14, wherein the ionic liquid IL is a mixture of ionic liquids consisting of at least one neutral protic-salt ionic liquid.

22. The polymer electrolyte membrane of claim 20, wherein the ionic liquid IL is a neutral product of an acid and a base for which a proton transfer energy lies in the range between 0.5-1.5 eV.

23. The polymer electrolyte membrane of claim 22, wherein the base is selected from the group consisting of fluorinated hydrocarbons and the acid is selected from the group consisting of acids having a pKa in the range between −5 and −17.

24. The polymer electrolyte membrane of claim 22, wherein the base and the acid are selected from the group consisting of ammonium salts.

25. The polymer electrolyte membrane of claim 14, wherein the nanoparticles NP are selected from the group consisting of: modified fumed silica, unmodified fumed silica, titanium oxide, and aluminum oxide.

* * * * *

UNITED STATES PATENT AND TRADEMARK OFFICE
CERTIFICATE OF CORRECTION

| | |
|---|---|
| PATENT NO. | : 7,833,643 B2 |
| APPLICATION NO. | : 11/535467 |
| DATED | : November 16, 2010 |
| INVENTOR(S) | : Charles Austen Angell et al. |

It is certified that error appears in the above-identified patent and that said Letters Patent is hereby corrected as shown below:

Column 14, line 35 (claim 2), delete "poly(ethylelene" and insert -- poly(ethylene -- therefor.

Column 14, line 46 (claim 4), delete "sulfer" and insert -- sulfur -- therefor.

Column 14, line 65 (claim 5), delete "sulfer" and insert -- sulfur -- therefor.

Column 16, line 1 (claim 16), delete "poly(ethylelene" and insert -- poly(ethylene -- therefor.

Column 16, line 12 (claim 18), delete "sulfer" and insert -- sulfur -- therefor.

Column 16, line 31 (claim 19), delete "sulfer" and insert -- sulfur -- therefor.

Signed and Sealed this
Fifteenth Day of March, 2011

David J. Kappos
*Director of the United States Patent and Trademark Office*